US012566024B2

(12) United States Patent
Jung et al.

(10) Patent No.: US 12,566,024 B2
(45) Date of Patent: Mar. 3, 2026

(54) VACUUM ADIABATIC BODY AND METHOD FOR MANUFACTURING THE SAME

(71) Applicant: LG ELECTRONICS INC., Seoul (KR)

(72) Inventors: Wonyeong Jung, Seoul (KR); Deokhyun Youn, Seoul (KR); Duchan Ki, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 302 days.

(21) Appl. No.: 18/034,768

(22) PCT Filed: Nov. 1, 2021

(86) PCT No.: PCT/KR2021/015546
§ 371 (c)(1),
(2) Date: May 1, 2023

(87) PCT Pub. No.: WO2022/092956
PCT Pub. Date: May 5, 2022

(65) Prior Publication Data
US 2023/0400246 A1      Dec. 14, 2023

(30) Foreign Application Priority Data

Nov. 2, 2020      (KR) ......................... 10-2020-0144780
Nov. 2, 2020      (KR) ......................... 10-2020-0144802

(51) Int. Cl.
*F25D 23/06*          (2006.01)
*B23K 1/00*          (2006.01)
*B23K 1/002*          (2006.01)

(52) U.S. Cl.
CPC .......... *F25D 23/062* (2013.01); *B23K 1/0008* (2013.01); *B23K 1/002* (2013.01); *F25D 23/067* (2013.01); *F25D 2201/14* (2013.01)

(58) Field of Classification Search
CPC ........................... B23K 1/0008; F25D 23/062
See application file for complete search history.

(56) References Cited

U.S. PATENT DOCUMENTS 2,171,306  A  *   8/1939   Ireland ............... B23K 35/3606
                                                      106/287.18
2,466,700  A  *   4/1949   Grodsky ................... C22C 9/00
                                                      420/485

(Continued)

FOREIGN PATENT DOCUMENTS

CN             1055770  A  *  10/1991
CN             202934254  U      5/2013

(Continued)

OTHER PUBLICATIONS

International Search Report (with English Translation) and Written Opinion dated Feb. 18, 2022 issued in Application No. PCT/KR2021/015546.

(Continued)

*Primary Examiner* — Jason W San

(74) *Attorney, Agent, or Firm* — KED & ASSOCIATES

(57)          ABSTRACT

A vacuum adiabatic body according to an embodiment may include a first plate, a second plate, and a seal that seals a gap between the first plate and the second plate. Optionally, the vacuum adiabatic body according to an embodiment may include a support that maintains a vacuum space. Optionally, the vacuum adiabatic body according to an embodiment may include a heat transfer resistor that reduces an amount of heat transfer between the first plate and the second plate.

(Continued)

Optionally, the vacuum adiabatic body may include a component coupling portion connected to at least one of the first or second plate so that a component is coupled thereto. Optionally, a tube passing through at least one of the first plate or the second plate may be provided. Optionally, the tube may be provided as a tube having a predetermined shape. Optionally, a filter metal provided on a bonding surface between the tube and the plate may be provided. Accordingly, the vacuum adiabatic body may be improved in productivity.

20 Claims, 19 Drawing Sheets

(56) References Cited

U.S. PATENT DOCUMENTS

| | | | | |
|---|---|---|---|---|
| 3,289,423 | A | * | 12/1966 | Berner .................. F17C 13/086 |
| | | | | 220/62.19 |
| 3,834,096 | A | * | 9/1974 | Becker ...................... E04B 1/80 |
| | | | | 52/793.1 |
| 2011/0011920 | A1 | | 1/2011 | Harris |
| 2012/0258273 | A1 | | 10/2012 | Churchill |
| 2013/0248586 | A1 | | 9/2013 | Harris |
| 2018/0224197 | A1 | * | 8/2018 | Jung .................... F25D 23/063 |
| 2021/0041162 | A1 | * | 2/2021 | Jung .................... F25D 23/061 |
| 2023/0408173 | A1 | * | 12/2023 | Jung ...................... B32B 15/18 |

FOREIGN PATENT DOCUMENTS

| | | | | | |
|---|---|---|---|---|---|
| JP | 07-001392 | | | 1/1995 | |
| JP | 2004232735 | A | * | 8/2004 | |
| JP | 2007-057100 | A | | 3/2007 | |
| JP | 4175905 | B2 | * | 11/2008 | |
| JP | 2011033079 | A | * | 2/2011 | |
| JP | 2011174602 | A | * | 9/2011 | |
| JP | 5313800 | B2 | * | 10/2013 | |
| JP | 2016-049561 | | | 4/2016 | |
| KR | 10-2004-0102490 | A | | 12/2004 | |
| KR | 10-1232652 | B1 | | 2/2013 | |
| KR | 10-2017-0016240 | A | | 2/2017 | |
| KR | 20170016242 | A | * | 2/2017 | |
| KR | 20200001383 | A | * | 1/2020 | |
| KR | 20220059343 | A | * | 5/2022 | |
| WO | WO-2017023075 | A1 | * | 2/2017 | ............ F16L 59/065 |
| WO | WO-2021139267 | A1 | * | 7/2021 | ............. F25D 11/02 |
| WO | WO-2022092925 | A1 | * | 5/2022 | ........... B23K 1/0008 |
| WO | WO-2022092956 | A1 | * | 5/2022 | ........... B23K 1/0008 |

OTHER PUBLICATIONS

Korean Office Action dated Jun. 19, 2025, issued in Application No. 10-2020-0144780.

Korean Office Action dated Jun. 30, 2025, issued in Application No. 10-2020-0144802.

* cited by examiner

[Fig. 1]
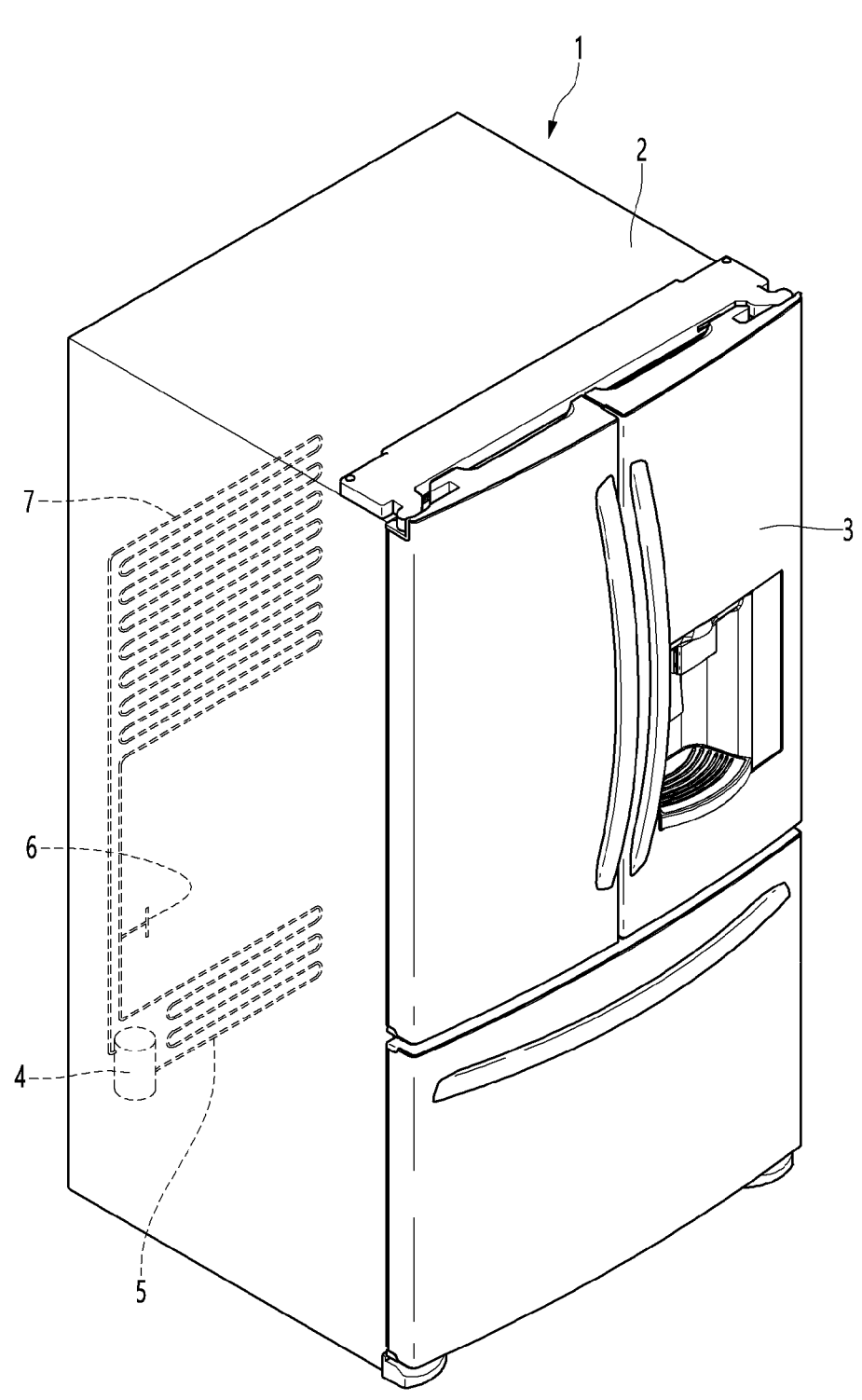

[Fig. 2]
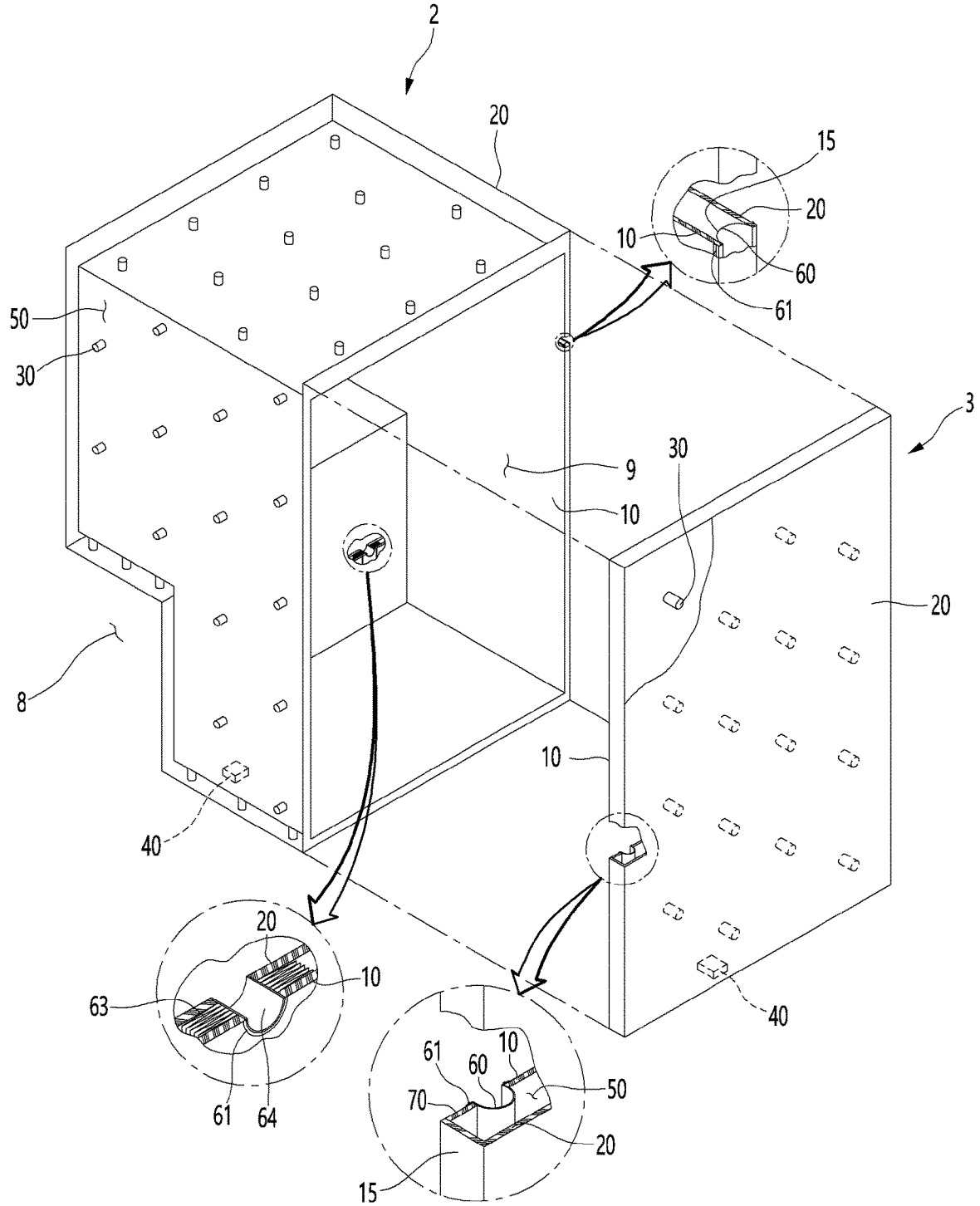

[Fig. 3]
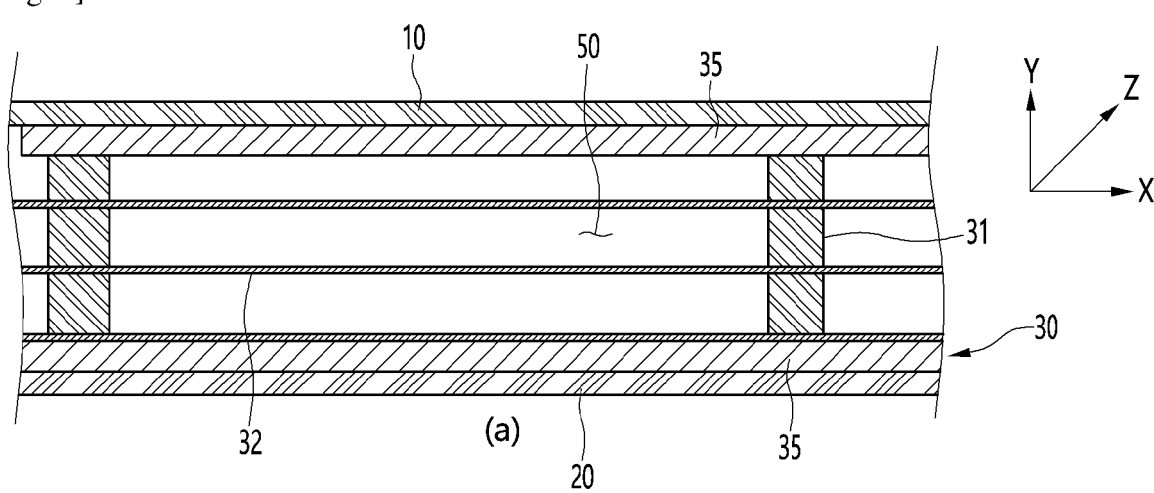
(a)
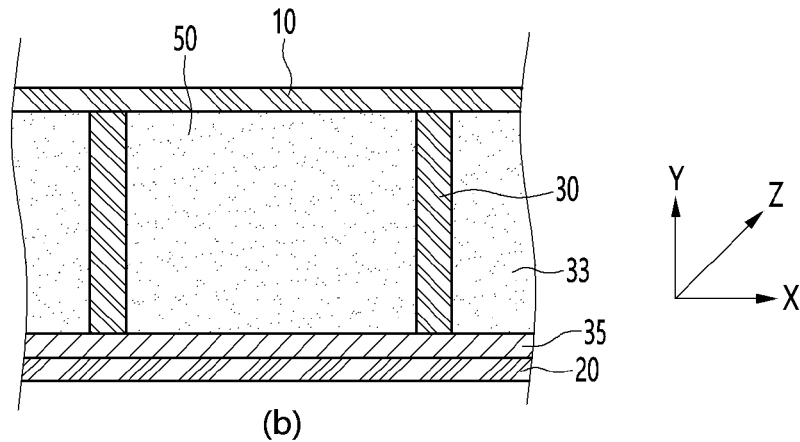
(b)
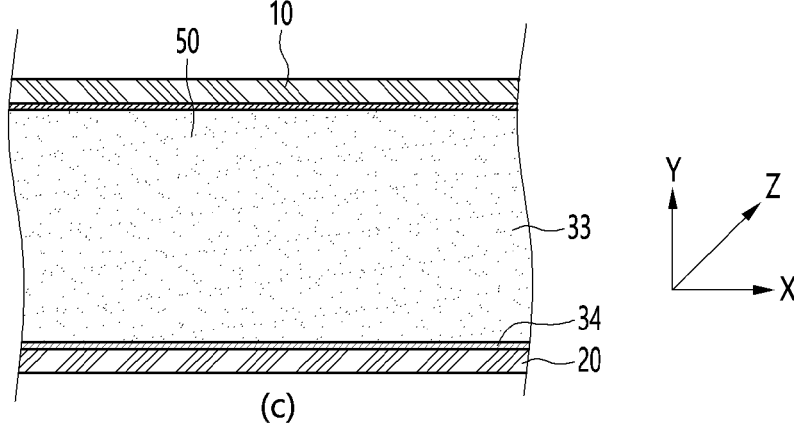
(c)

[Fig. 4]
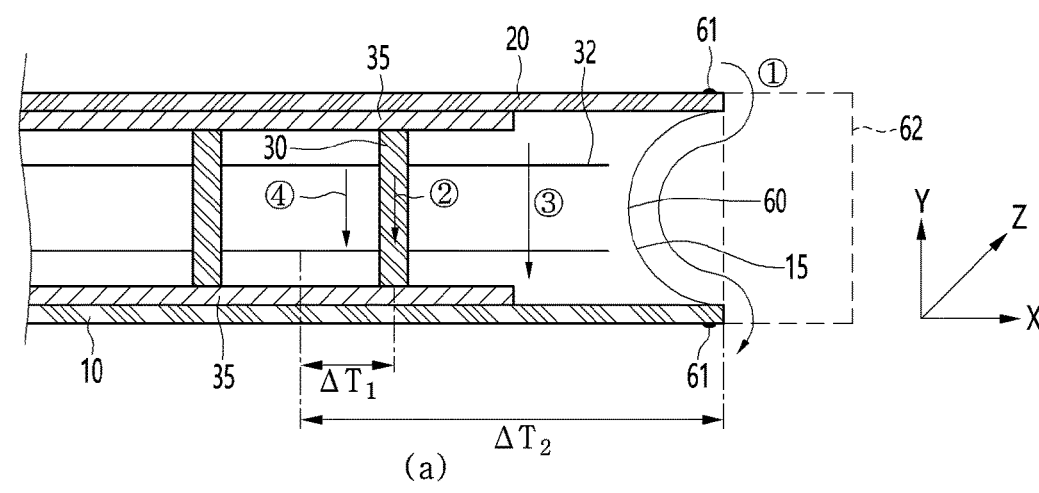
(a)
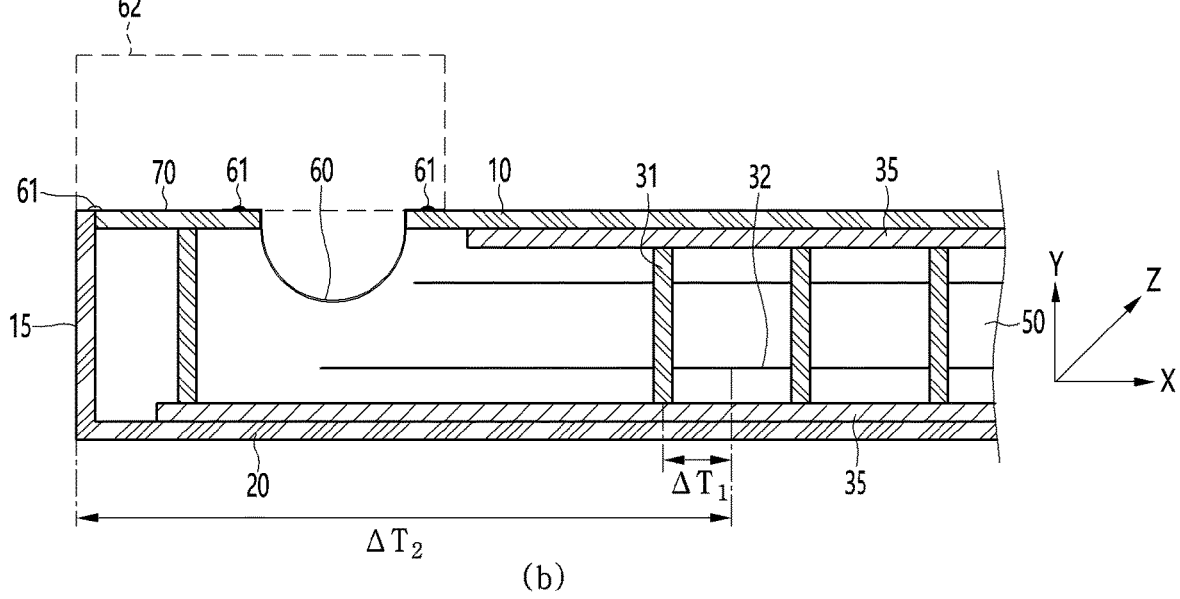
(b)
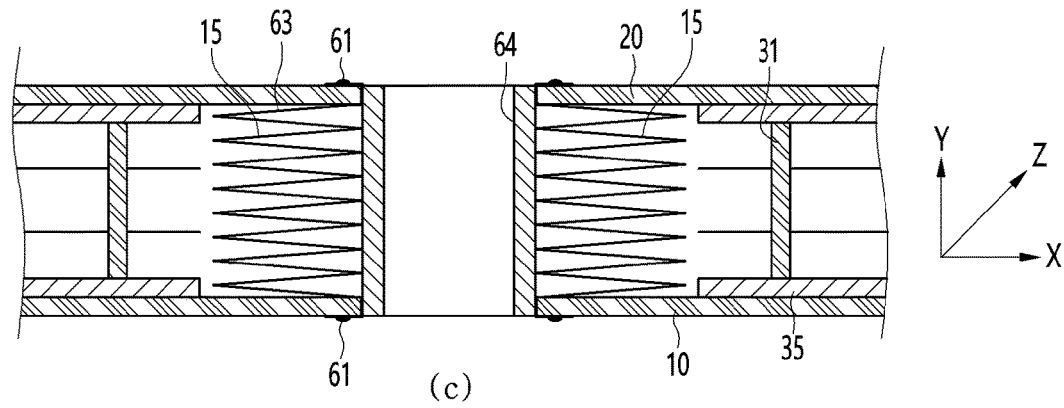
(c)

[Fig. 5]
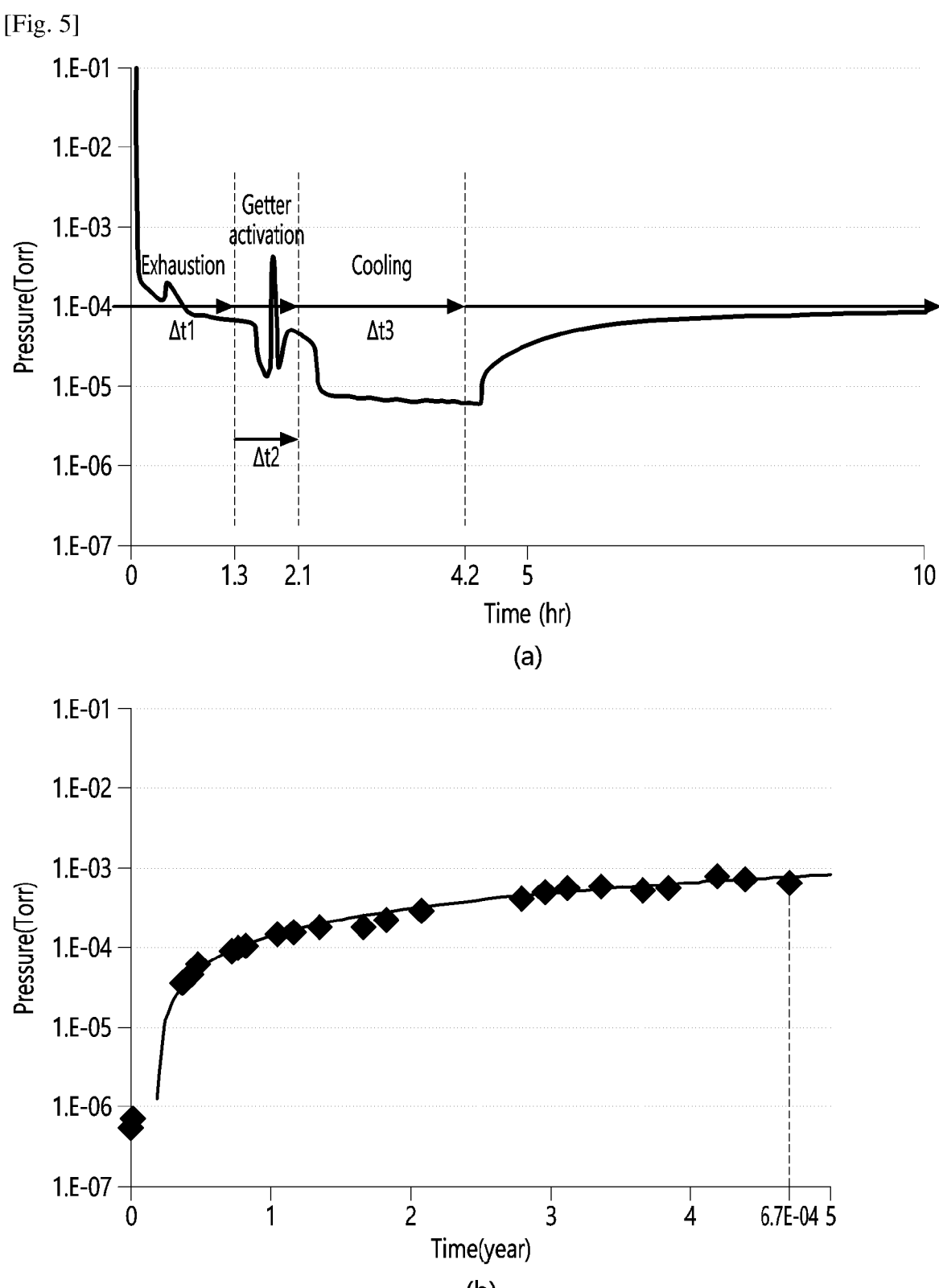
(a)
(b)

[Fig. 6]
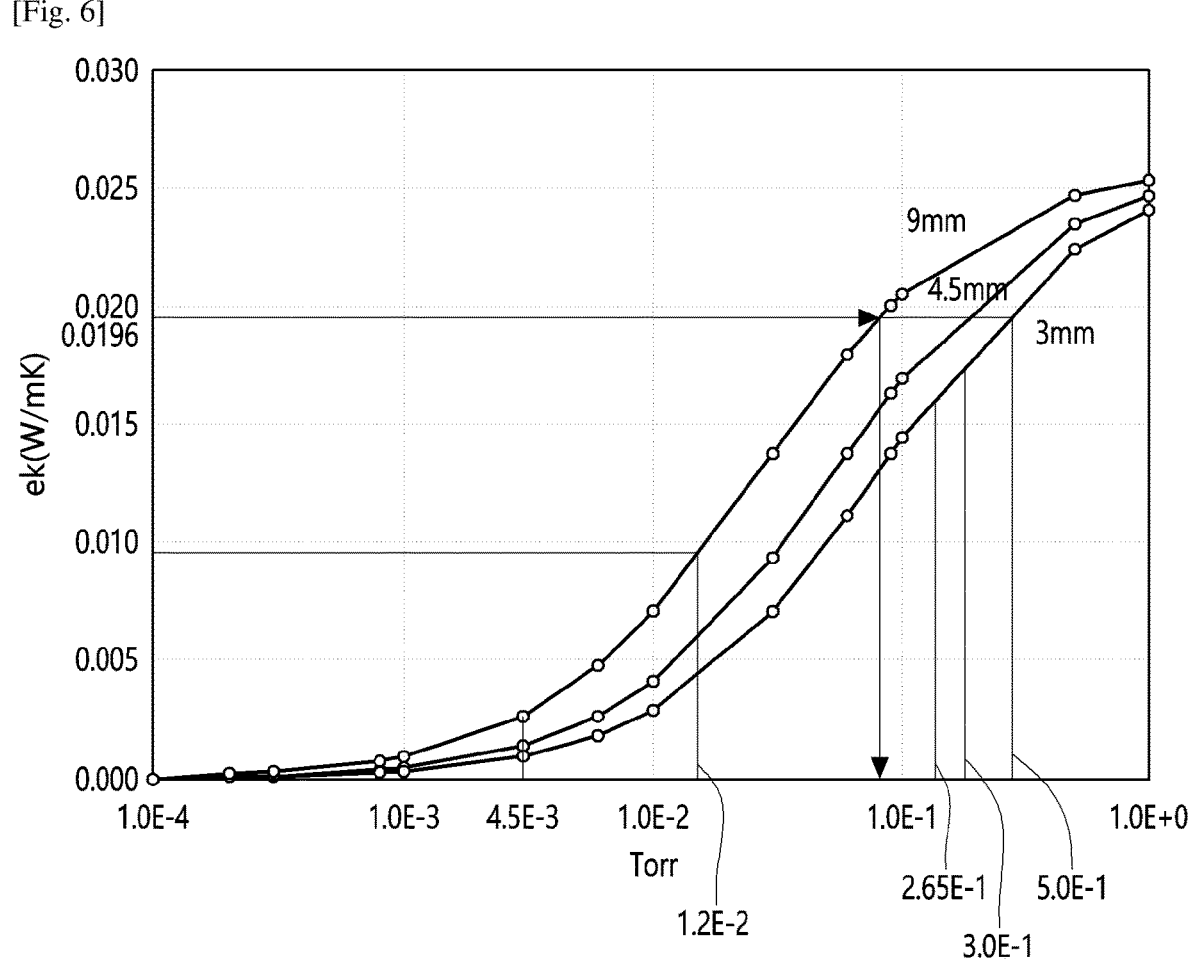

[Figure 7]
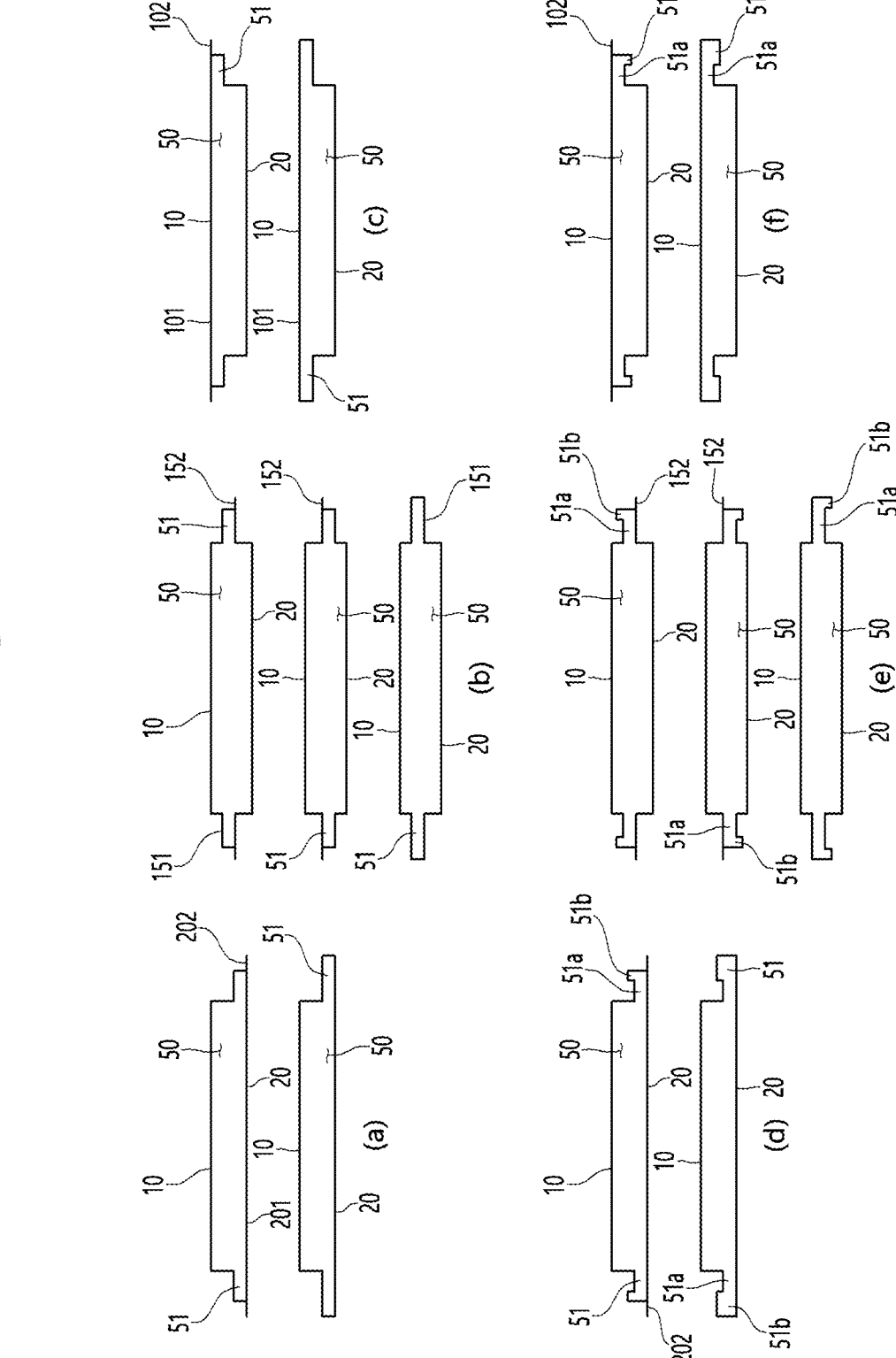

[Figure 8]
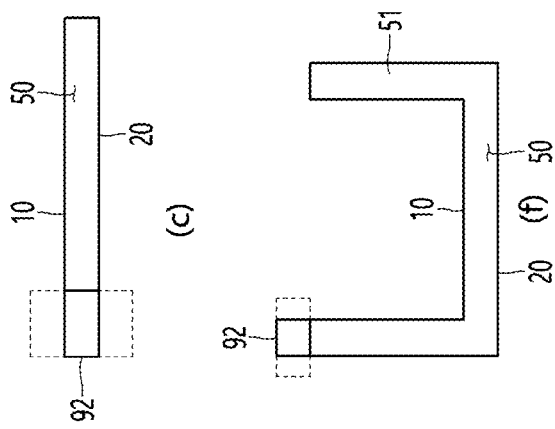
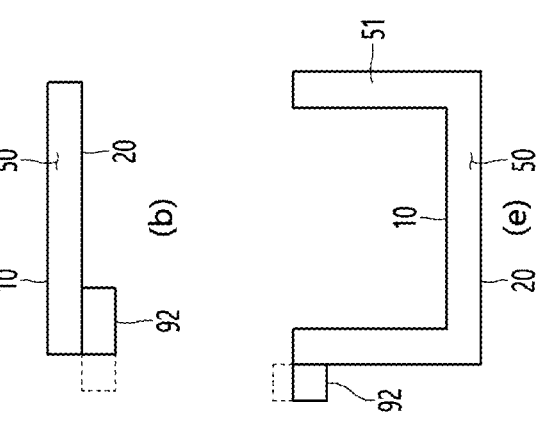
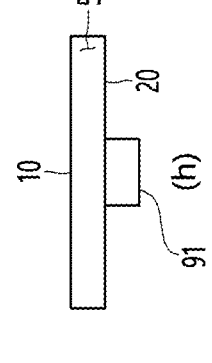
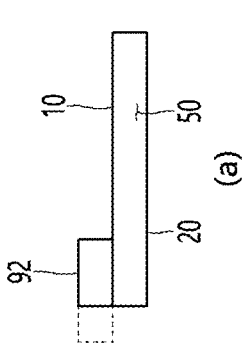
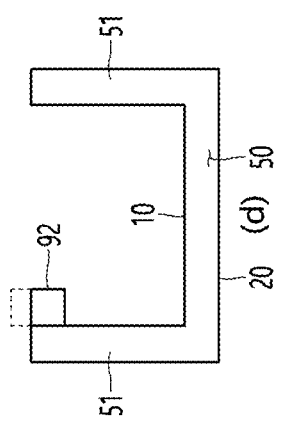
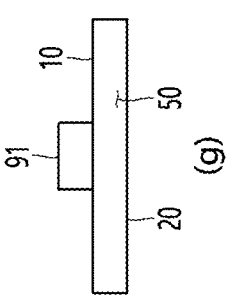

[Figure 9]
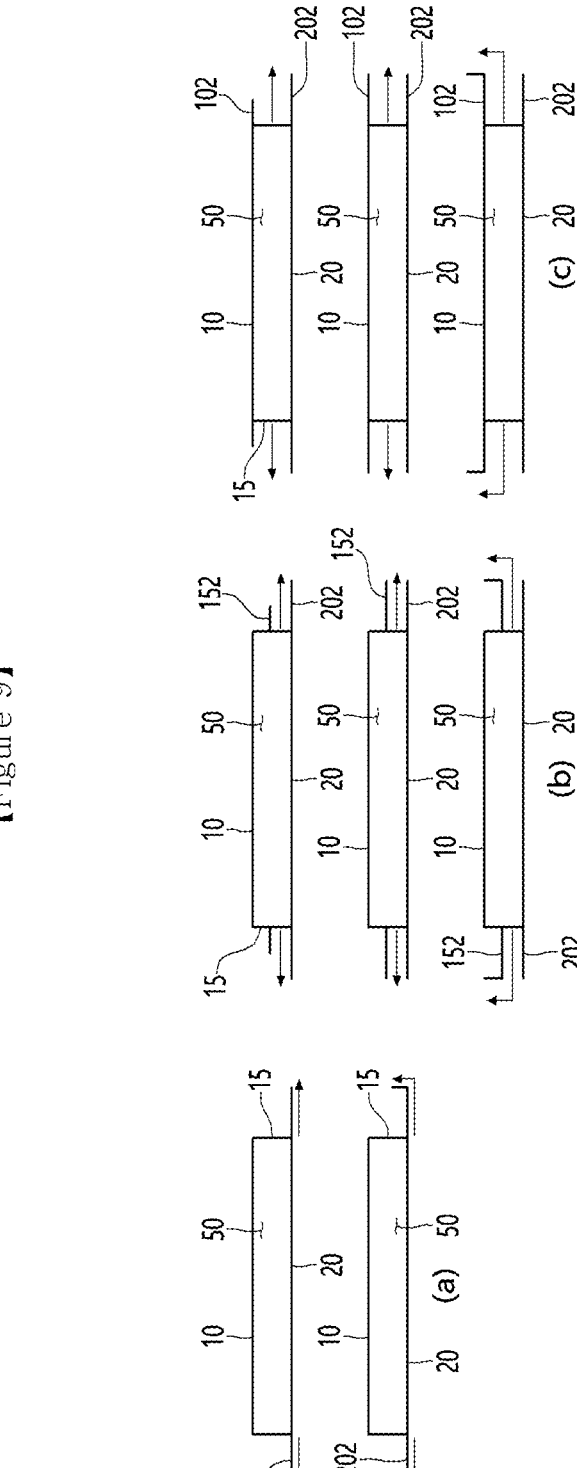

[Figure 10]
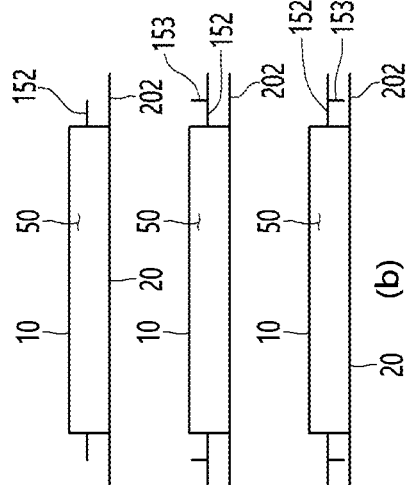
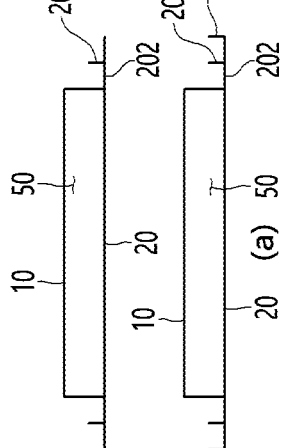

[Figure 11]
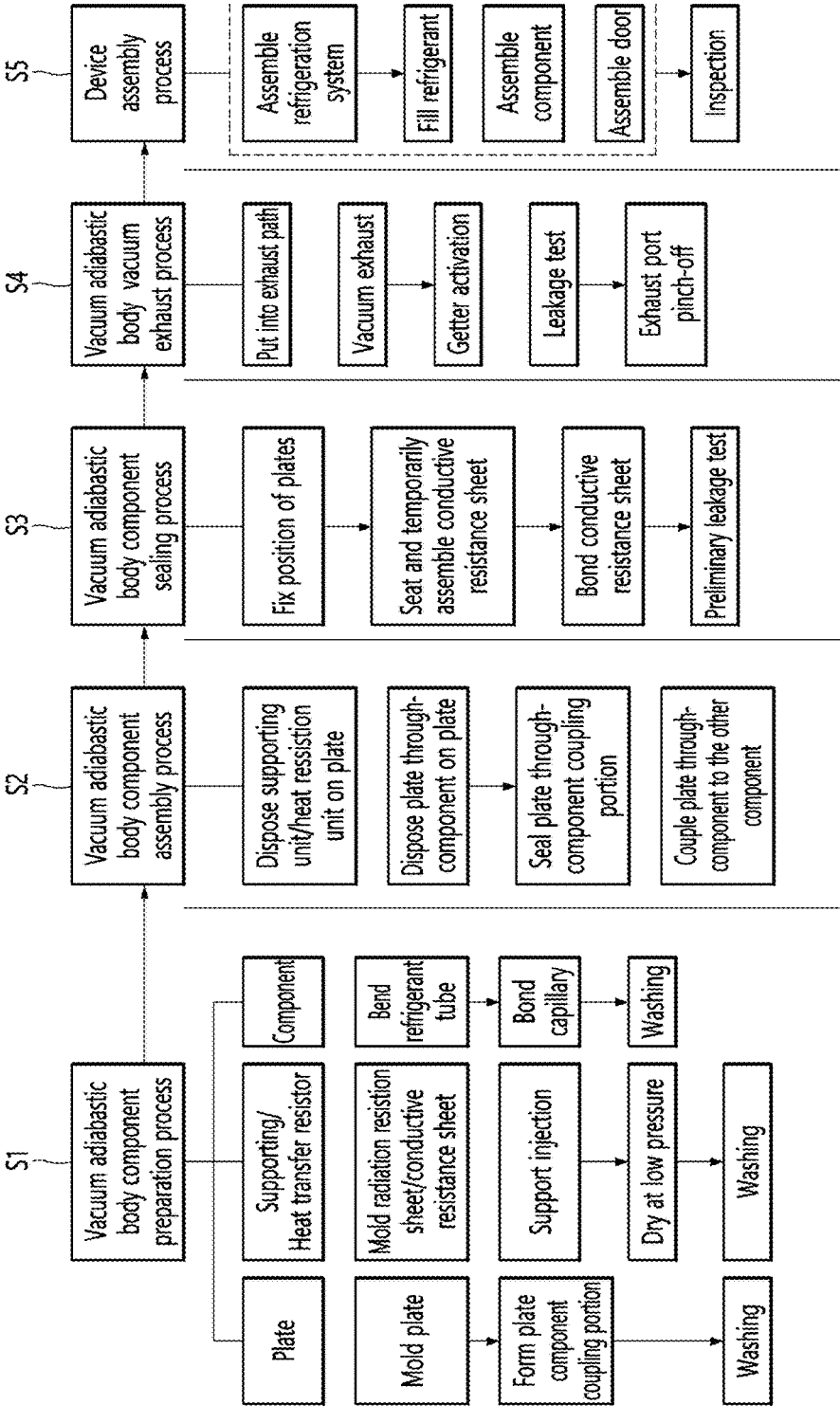

```
┌────────────────────────────────────────────────────────────┐
│              Process hole in first plate                   │──S1
└────────────────────────────────────────────────────────────┘
                            │
                            ▼
┌────────────────────────────────────────────────────────────┐
│ Perform pressing using tool having diameter less than that of hole │──S2
└────────────────────────────────────────────────────────────┘
```

[Fig. 14]
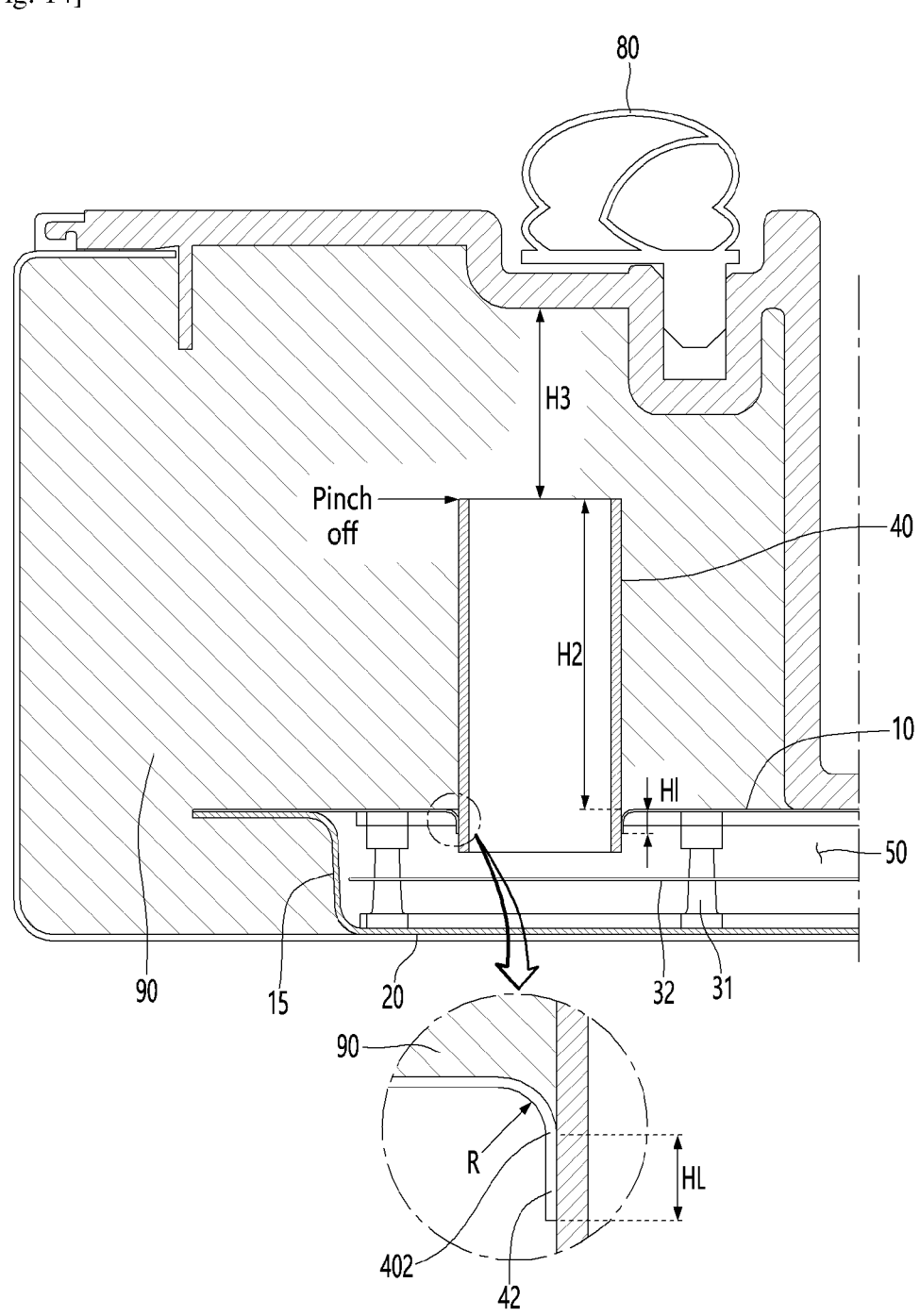

[Fig. 15]
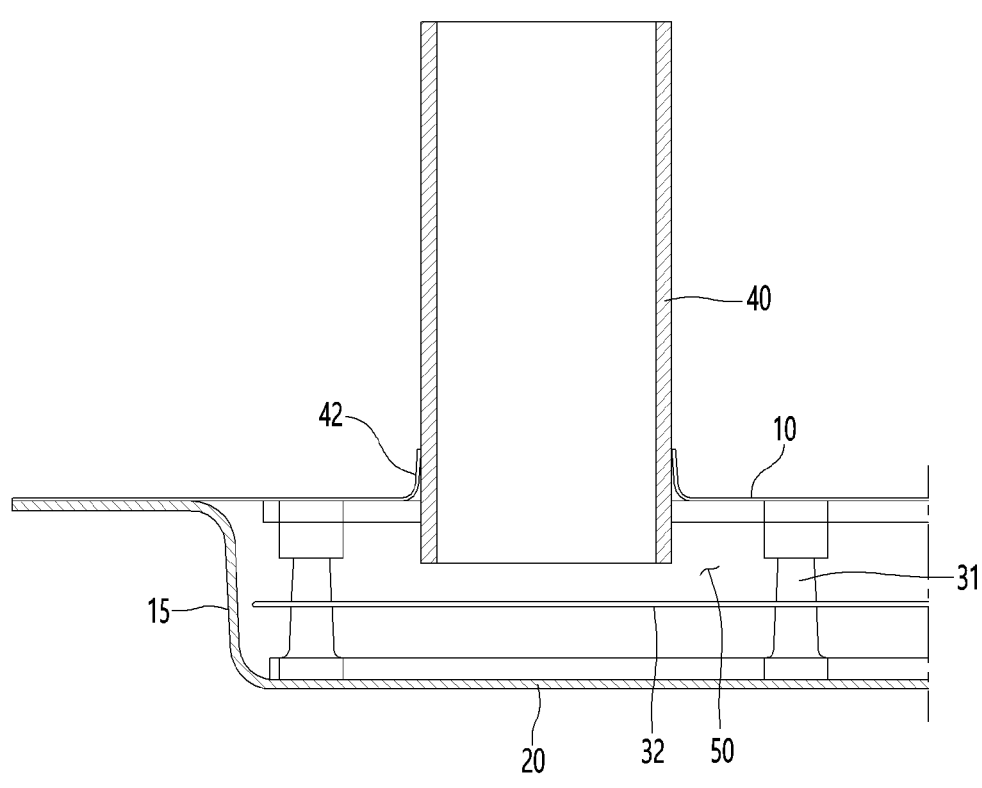

[Fig. 16]
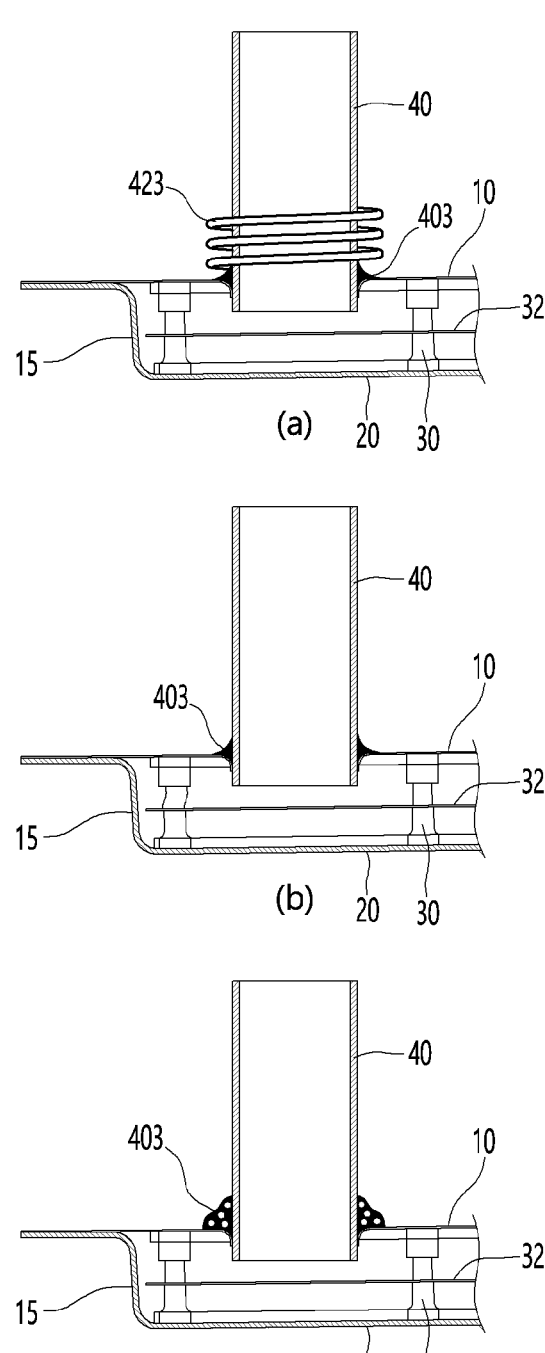

[Fig. 17]
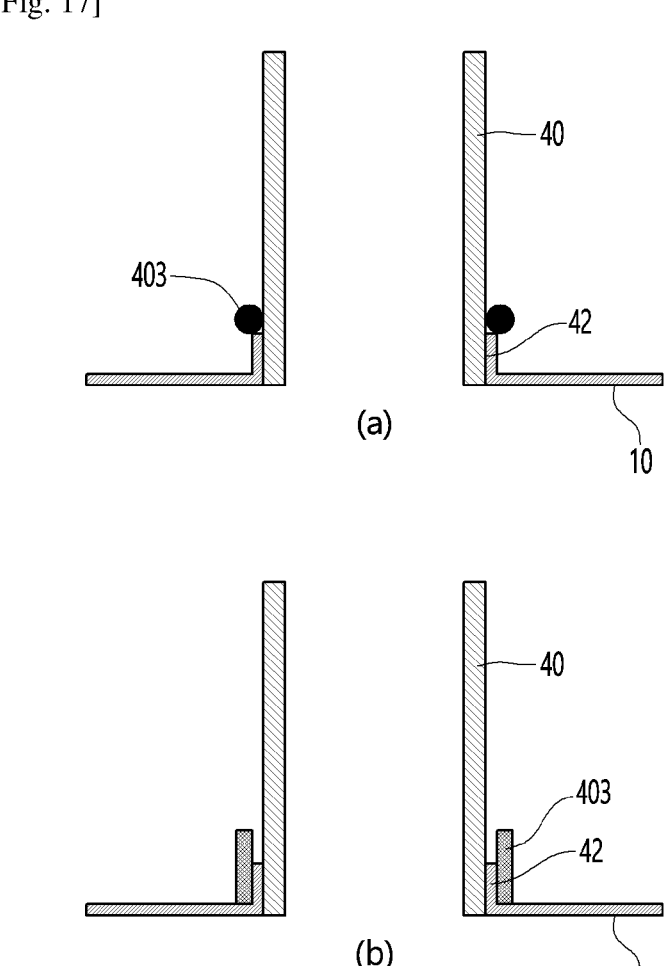
(a)
(b)
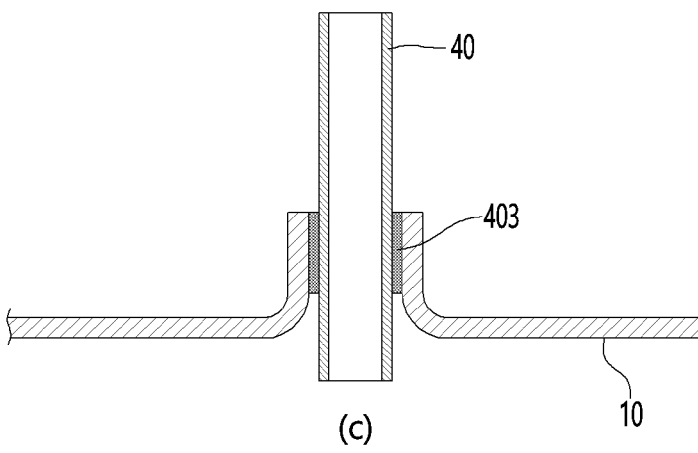
(c)

[Fig. 18]
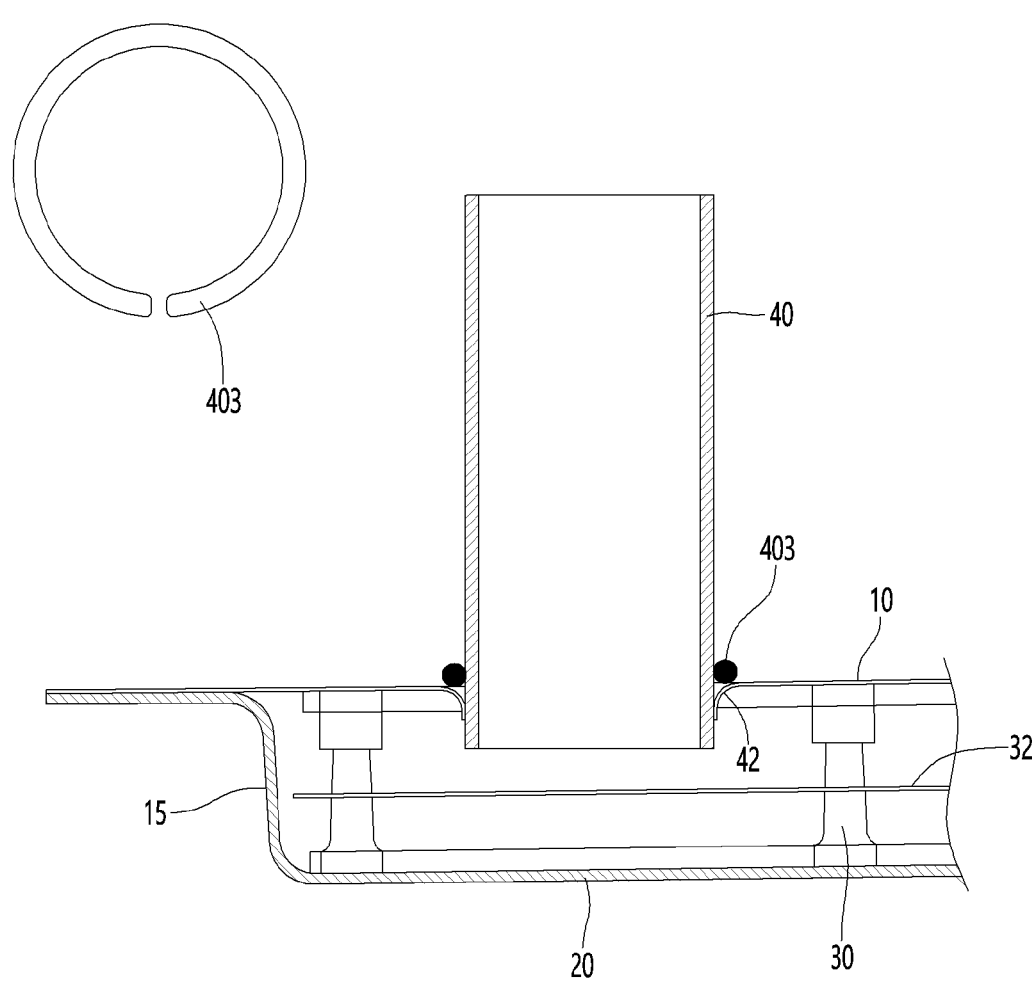
[Fig. 19]
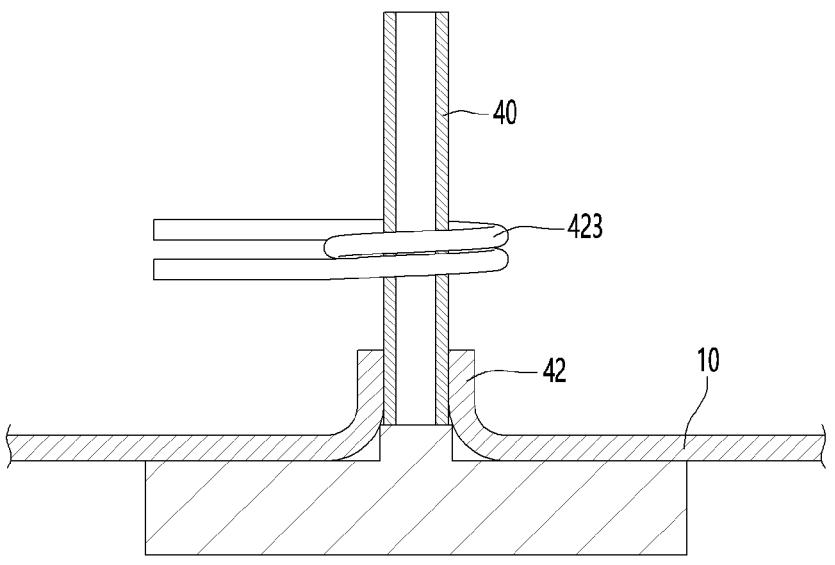

[Fig. 20]
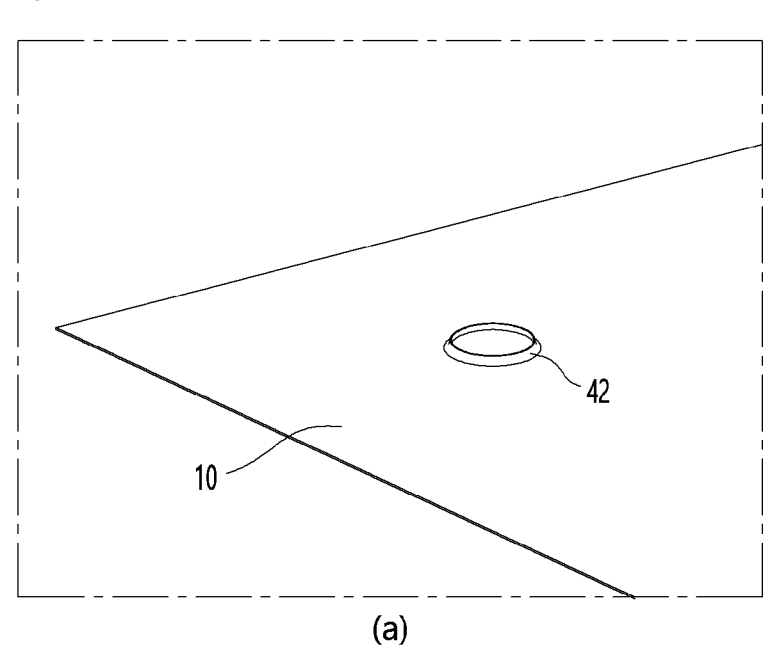
(a)
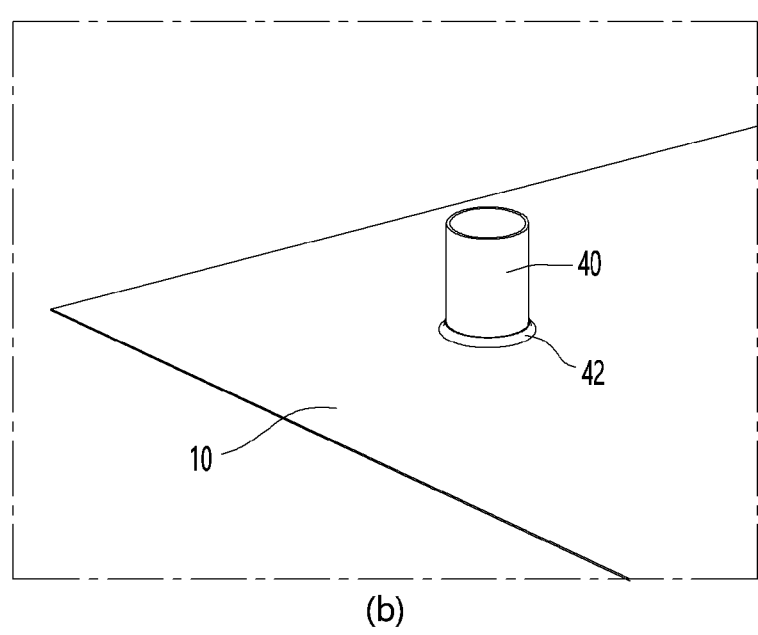
(b)

[Fig. 21]
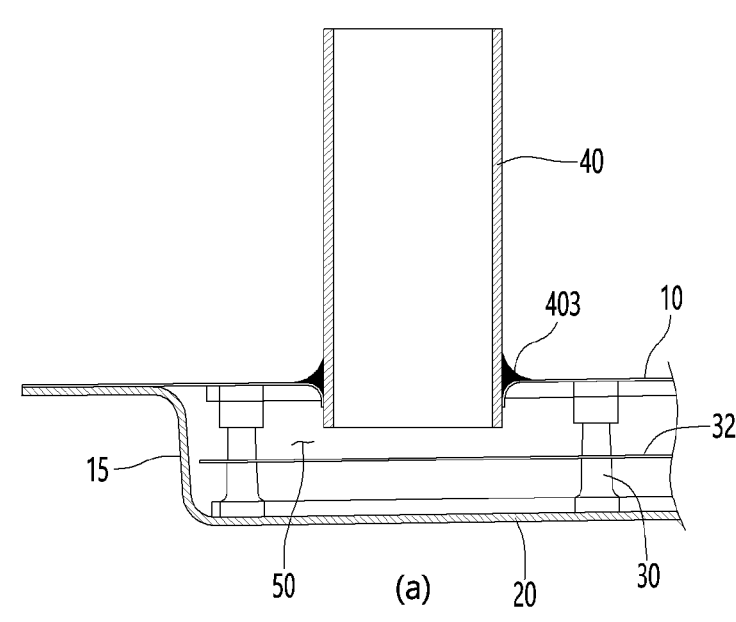
(a)
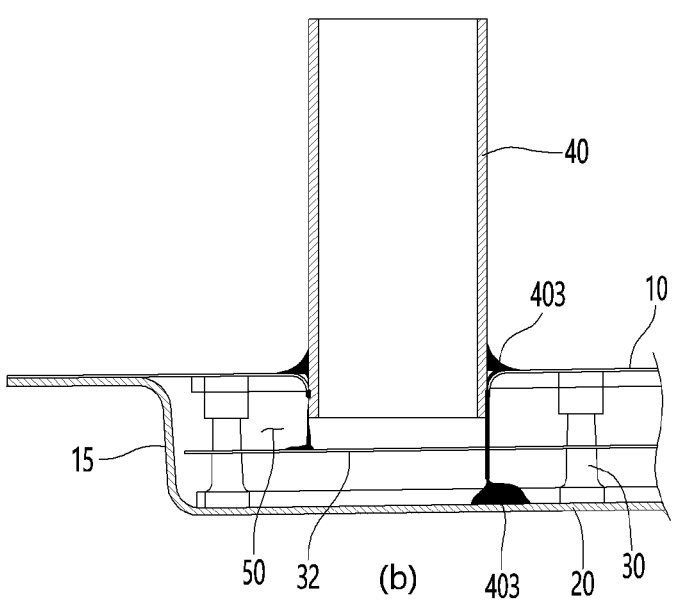
(b)

VACUUM ADIABATIC BODY AND METHOD FOR MANUFACTURING THE SAME

CROSS-REFERENCE TO RELATED PATENT APPLICATIONS

This application is a U.S. National Stage Application under 35 U.S.C. § 371 of PCT Application No. PCT/KR2021/015546, filed Nov. 1, 2021, which claims priority to Korean Patent Application Nos. 10-2020-0144780 and 10-2020-0144802, both filed Nov. 2, 2020, whose entire disclosures are hereby incorporated by reference.

TECHNICAL FIELD

The present disclosure relates to a vacuum adiabatic body and a method for manufacturing the same.

BACKGROUND ART

A vacuum adiabatic wall may be provided to improve adiabatic performance. A device of which at least a portion of an internal space is provided in a vacuum state to achieve an adiabatic effect is referred to as a vacuum adiabatic body.

The applicant has developed a technology to obtain a vacuum adiabatic body that is capable of being used in various devices and home appliances. Accordingly, the applicant has proposed a technology for disposing an exhaust port to exhaust air inside a vacuum space in Korean Patent Application No. 10-2015-01097235.

The cited document discloses a feature in which the tube is provided on a first plate of the vacuum adiabatic body. A method of providing the tube, a specific configuration of the tube, and a method of coupling the tube to the plate are not disclosed.

DISCLOSURE OF INVENTION

Technical Problem

Embodiments provide a method for optimally coupling a tube to a plate when the tube necessary from various operations of a vacuum adiabatic body is provided. For example, a method of directly melting and bonding the tubes and the plates is not preferable because high-temperature heat is generated. Examples of the aforementioned tube may be ports such as an exhaust port or a getter port.

Embodiments also provide a structure of coupling a tube to a plate with sufficient reliability that is enough to prevent vacuum breakage from occurring in a bonding surface in the future without occurring leakage through the bonding surface of the tube and the plate.

Embodiments also provide a method for coupling a port to a plate, which is capable of ensuring sufficient strength of the bonding portion between the tube and the plate.

Embodiments also provide a method for coupling a tube to a plate, which does not cause damage of other adjacent portions when the tube and the plate are bonded to each other. For example, if excessively high-temperature heat is applied, or the fluidity of a filler metal is large, damage of other adjacent members and vacuum breakage may occur.

Solution to Problem

A vacuum adiabatic body according to an embodiment may include a first plate, a second plate, and a seal that seals a gap between the first plate and the second plate. Optionally, the vacuum adiabatic body according to an embodiment may include a support that maintains a vacuum space. Optionally, the vacuum adiabatic body according to an embodiment may include a heat transfer resistor that reduces an amount of heat transfer between the first plate and the second plate. Optionally, the vacuum adiabatic body may include a component coupling portion connected to at least one of the first or second plate so that a component is coupled thereto. Accordingly, the vacuum adiabatic body capable of achieving the industrial purpose may be provided.

Optionally, a tube passing through at least one of the first plate or the second plate may be provided. Optionally, the tube may be provided as a tube having a predetermined shape. Optionally, a filler metal interposed between the tube and the bonding surface of the plate to which the tube is coupled may be provided. Examples of the aforementioned tube may be ports such as an exhaust port or a getter port.

Optionally, the filler metal may be a phosphor-copper alloy including phosphorus (In) and copper (Cu).

Optionally, the method for manufacturing the vacuum adiabatic body may include a vacuum adiabatic body component preparation process in which components constituting the vacuum adiabatic body are prepared in advance to manufacture the vacuum adiabatic body. Optionally, the method may include a vacuum adiabatic body component assembly process in which the prepared components are assembled. Optionally, after the component assembly process, a vacuum adiabatic body exhaust process in which a gas in a space formed between the first plate and the second plate is discharged may be performed.

Optionally, in at least one of the vacuum adiabatic body component assembly process or the vacuum adiabatic body vacuum exhaust process, the tube and at least one of the first plate and the second plate may be coupled by brazing.

Optionally, the filler metal may be disposed on a protrusion of an end of the flange.

Optionally, the first plate may be provided to be thinner than the second plate.

Optionally, the tube may be guided to the flange. The tube may extend in the height direction of the vacuum space. The tube may serve as an exhaust port. The tube may serve as a getter port.

Optionally, in order for the liquid filler metal to be penetrated into the contact surface between the tube and the flange, the liquid filler metal may have at least one of good permeability, good flowability, and good wettability.

Optionally, alloy including at least one of silver, copper, and zinc may be used for the filler metal.

Advantageous Effects of Invention

According to the embodiment, since the tube and the plate are coupled by the brazing, the direct melting of the member may not occur, and thus the design shape of the two members may be maintained. In addition, the sufficient bonding strength may be obtained even when the materials of the tube and the plate are different.

In the embodiment, the phosphorus may be contained as the material in the filler metal of the brazing, and thus, the phosphorus may be penetrated into the bonding surface of the tube and the plate. Therefore, the leakage of the bonding surface may not occur.

In the embodiment, the tube and the filler metal may include the same material. For example, it may include copper. Therefore, since the member is firmly coupled to secure the sufficient bonding strength.

BRIEF DESCRIPTION OF DRAWINGS

FIG. 1 is a perspective view of a refrigerator according to an embodiment.

FIG. 2 is a view schematically illustrating a vacuum adiabatic body used in a body and a door of the refrigerator.

FIG. 3 is a view illustrating an example of a support that maintains a vacuum space.

FIG. 4 is a view for explaining an example of the vacuum with respect to a heat transfer resistor.

FIG. 5 is a graph illustrating results obtained by observing a process of exhausting the inside of the vacuum adiabatic body with a time and pressure when the support is used.

FIG. 6 is a graph illustrating results obtained by comparing a vacuum pressure to gas conductivity.

FIG. 7 is a view illustrating various examples of the vacuum space.

FIG. 8 is a view for explaining another adiabatic body.

FIG. 9 is a view for explaining a heat transfer path between first and second plates having different temperatures.

FIG. 10 is a view for explaining a branch portion on the heat transfer path between first and second plates having different temperatures.

FIG. 11 is a view for explaining a method for manufacturing a vacuum adiabatic body.

FIG. 12 is an enlarged perspective view illustrating an upper side of a corner portion in which a tube is installed in the vacuum adiabatic body.

FIG. 13 is a view for explaining a method of processing a through-hole of the first plate.

FIG. 14 is a cross-sectional view taken along line 1-1' of (b) of FIG. 12.

FIG. 15 illustrates an example in which a flange extends toward the outside of the vacuum space.

FIG. 16 is a view illustrating a portion at which a brazing process is performed, wherein (a) of FIG. 16 illustrates a case in which a phosphorus content is appropriate, (b) of FIG. 16 illustrates a case in which the phosphorus content is insufficient, and (c) of FIG. 16 illustrates a case in which the phosphorus content is excessive.

FIG. 17 is a view illustrating an installation method of the filler metal when a flange extends to the outside of the vacuum space.

FIG. 18 is a view illustrating an installation method of the filler metal when the flange extends into the vacuum space.

FIG. 19 is a view for explaining an operation of high-frequency brazing according to another embodiment.

FIG. 20 is a view illustrating a distance between the flange and the tube of FIG. 19.

FIG. 21 is a view comparing a case (a) in which permeability and flowability of a liquid filler metal are appropriate, and a case (b) in which the permeability and flowability of the liquid filler metal are excessively high.

MODE FOR THE INVENTION

Hereinafter, specific embodiments will be described in detail with reference to the accompanying drawings. The invention may, however, be embodied in many different forms and should not be construed as being limited to the embodiments set forth herein, and a person of ordinary skill in the art, who understands the spirit of the present invention, may readily implement other embodiments included within the scope of the same concept by adding, changing, deleting, and adding components; rather, it will be understood that they are also included within the scope of the present invention. The present invention may have many embodiments in which the idea is implemented, and in each embodiment, any portion may be replaced with a corresponding portion or a portion having a related action according to another embodiment. The present invention may be any one of the examples presented below or a combination of two or more examples.

The present disclosure relates to a vacuum adiabatic body including a first plate; a second plate; a vacuum space defined between the first and second plates; and a seal providing the vacuum space that is in a vacuum state. The vacuum space may be a space in a vacuum state provided in an internal space between the first plate and the second plate. The seal may seal the first plate and the second plate to provide the internal space provided in the vacuum state. The vacuum adiabatic body may optionally include a side plate connecting the first plate to the second plate. In the present disclosure, the expression "plate" may mean at least one of the first and second plates or the side plate. At least a portion of the first and second plates and the side plate may be integrally provided, or at least portions may be sealed to each other. Optionally, the vacuum adiabatic body may include a support that maintains the vacuum space. The vacuum adiabatic body may selectively include a thermal insulator that reduces an amount of heat transfer between a first space provided in vicinity of the first plate and a second space provided in vicinity of the second plate or reduces an amount of heat transfer between the first plate and the second plate. Optionally, the vacuum adiabatic body may include a component coupling portion provided on at least a portion of the plate. Optionally, the vacuum adiabatic body may include another adiabatic body. Another adiabatic body may be provided to be connected to the vacuum adiabatic body. Another adiabatic body may be an adiabatic body having a degree of vacuum, which is equal to or different from a degree of vacuum of the vacuum adiabatic body. Another adiabatic body may be an adiabatic body that does not include a degree of vacuum less than that of the vacuum adiabatic body or a portion that is in a vacuum state therein. In this case, it may be advantageous to connect another object to another adiabatic body.

In the present disclosure, a direction along a wall defining the vacuum space may include a longitudinal direction of the vacuum space and a height direction of the vacuum space. The height direction of the vacuum space may be defined as any one direction among virtual lines connecting the first space to the second space to be described later while passing through the vacuum space. The longitudinal direction of the vacuum space may be defined as a direction perpendicular to the set height direction of the vacuum space. In the present disclosure, that an object A is connected to an object B means that at least a portion of the object A and at least a portion of the object B are directly connected to each other, or that at least a portion of the object A and at least a portion of the object B are connected to each other through an intermedium interposed between the objects A and B. The intermedium may be provided on at least one of the object A or the object B. The connection may include that the object A is connected to the intermedium, and the intermedium is connected to the object B. A portion of the intermedium may include a portion connected to either one of the object A and the object B. The other portion of the intermedium may include a portion connected to the other of the object A and the object B. As a modified example, the connection of the object A to the object B may include that the object A and the object B are integrally prepared in a shape connected in the above-described manner. In the present disclosure, an embodiment of the connection may be support, combine, or a seal, which will be described later. In the present disclosure, that the object A is supported by the object B means that the object A is restricted in movement by the object B in one or more of the +X, −X, +Y, −Y, +Z, and −Z axis directions. In the present invention, an embodiment of the support may be the combine or seal, which will be described later. In the present invention, that the object A is combined with the object B may define that the object A is restricted in movement by the object B in one or more of the X, Y, and Z-axis directions. In the present disclosure, an embodiment of the combining may be the sealing to be described later. In the present disclosure, that the object A is sealed to the object B may define a state in which movement of a fluid is not allowed at the portion at which the object A and the object B are connected. In the present disclosure, one or more objects, i.e., at least a portion of the object A and the object B, may be defined as including a portion of the object A, the whole of the object A, a portion of the object B, the whole of the object B, a portion of the object A and a portion of the object B, a portion of the object A and the whole of the object B, the whole of the object A and a portion of the object B, and the whole of the object A and the whole of the object B. In the present disclosure, that the plate A may be a wall defining the space A may be defined as that at least a portion of the plate A may be a wall defining at least a portion of the space A. That is, at least a portion of the plate A may be a wall forming the space A, or the plate A may be a wall forming at least a portion of the space A. In the present disclosure, a central portion of the object may be defined as a central portion among three divided portions when the object is divided into three sections based on the longitudinal direction of the object. A periphery of the object may be defined as a portion disposed at a left or right side of the central portion among the three divided portions. The periphery of the object may include a surface that is in contact with the central portion and a surface opposite thereto. The opposite side may be defined as a border or edge of the object. Examples of the object may include a vacuum adiabatic body, a plate, a heat transfer resistor, a support, a vacuum space, and various components to be introduced in the present disclosure. In the present disclosure, a degree of heat transfer resistance may indicate a degree to which an object resists heat transfer and may be defined as a value determined by a shape including a thickness of the object, a material of the object, and a processing method of the object. The degree of the heat transfer resistance may be defined as the sum of a degree of conduction resistance, a degree of radiation resistance, and a degree of convection resistance. The vacuum adiabatic body according to the present disclosure may include a heat transfer path defined between spaces having different temperatures, or a heat transfer path defined between plates having different temperatures. For example, the vacuum adiabatic body according to the present disclosure may include a heat transfer path through which cold is transferred from a low-temperature plate to a high-temperature plate. In the present disclosure, when a curved portion includes a first portion extending in a first direction and a second portion extending in a second direction different from the first direction, the curved portion may be defined as a portion that connects the first portion to the second portion (including 90 degrees).

In the present disclosure, the vacuum adiabatic body may optionally include a component coupling portion. The component coupling portion may be defined as a portion provided on the plate to which components are connected to each other. The component connected to the plate may be defined as a penetration portion disposed to pass through at least a portion of the plate and a surface component disposed to be connected to a surface of at least a portion of the plate. At least one of the penetration component or the surface component may be connected to the component coupling portion. The penetration component may be a component that defines a path through which a fluid (electricity, refrigerant, water, air, etc.) passes mainly. In the present disclosure, the fluid is defined as any kind of flowing material. The fluid includes moving solids, liquids, gases, and electricity. For example, the component may be a component that defines a path through which a refrigerant for heat exchange passes, such as a suction line heat exchanger (SLHX) or a refrigerant tube. The component may be an electric wire that supplies electricity to an apparatus. As another example, the component may be a component that defines a path through which air passes, such as a cold duct, a hot air duct, and an exhaust port. As another example, the component may be a path through which a fluid such as coolant, hot water, ice, and defrost water pass. The surface component may include at least one of a peripheral adiabatic body, a side panel, injected foam, a pre-prepared resin, a hinge, a latch, a basket, a drawer, a shelf, a light, a sensor, an evaporator, a front decor, a hotline, a heater, an exterior cover, or another adiabatic body.

As an example to which the vacuum adiabatic body is applied, the present disclosure may include an apparatus having the vacuum adiabatic body. Examples of the apparatus may include an appliance. Examples of the appliance may include home appliances including a refrigerator, a cooking appliance, a washing machine, a dishwasher, and an air conditioner, etc. As an example in which the vacuum adiabatic body is applied to the apparatus, the vacuum adiabatic body may constitute at least a portion of a body and a door of the apparatus. As an example of the door, the vacuum adiabatic body may constitute at least a portion of a general door and a door-in-door (DID) that is in direct contact with the body. Here, the door-in-door may mean a small door placed inside the general door. As another example to which the vacuum adiabatic body is applied, the present disclosure may include a wall having the vacuum adiabatic body. Examples of the wall may include a wall of a building, which includes a window.

Hereinafter, the present disclosure will be described in detail with reference to the accompanying drawings. Each of the drawings accompanying the embodiment may be different from, exaggerated, or simply indicated from an actual article, and detailed components may be indicated with simplified features. The embodiment should not be interpreted as being limited only to the size, structure, and shape presented in the drawings. In the embodiments accompanying each of the drawings, unless the descriptions conflict with each other, some configurations in the drawings of one embodiment may be applied to some configurations of the drawings in another embodiment, and some structures in one embodiment may be applied to some structures in another embodiment. In the description of the drawings for the embodiment, the same reference numerals may be assigned to different drawings as reference numerals of specific components constituting the embodiment. Components having the same reference number may perform the same function. For example, the first plate constituting the vacuum adiabatic body has a portion corresponding to the first space throughout all embodiments and is indicated by reference number 10. The first plate may have the same number for all embodiments and may have a portion corresponding to the first space, but the shape of the first plate may be different in each embodiment. Not only the first plate, but also the side plate, the second plate, and another adiabatic body may be understood as well.

FIG. 1 is a perspective view of a refrigerator according to an embodiment, and FIG. 2 is a schematic view illustrating a vacuum adiabatic body used for a body and a door of the refrigerator. Referring to FIG. 1, the refrigerator 1 includes a main body 2 provided with a cavity 9 capable of storing storage goods and a door 3 provided to open and close the main body 2. The door 3 may be rotatably or slidably disposed to open or close the cavity 9. The cavity 9 may provide at least one of a refrigerating compartment and a freezing compartment. A cold source that supplies cold to the cavity may be provided. For example, the cold source may be an evaporator 7 that evaporates the refrigerant to take heat. The evaporator 7 may be connected to a compressor 4 that compresses the refrigerant evaporated to the cold source. The evaporator 7 may be connected to a condenser 5 that condenses the compressed refrigerant to the cold source. The evaporator 7 may be connected to an expander 6 that expands the refrigerant condensed in the cold source. A fan corresponding to the evaporator and the condenser may be provided to promote heat exchange. As another example, the cold source may be a heat absorption surface of a thermoelectric element. A heat absorption sink may be connected to the heat absorption surface of the thermoelectric element. A heat sink may be connected to a heat radiation surface of the thermoelectric element. A fan corresponding to the heat absorption surface and the heat generation surface may be provided to promote heat exchange.

Referring to FIG. 2, plates 10, 15, and 20 may be walls defining the vacuum space. The plates may be walls that partition the vacuum space from an external space of the vacuum space. An example of the plates is as follows. The present disclosure may be any one of the following examples or a combination of two or more examples.

The plate may be provided as one portion or may be provided to include at least two portions connected to each other. As a first example, the plate may include at least two portions connected to each other in a direction along a wall defining the vacuum space. Any one of the two portions may include a portion (e.g., a first portion) defining the vacuum space. The first portion may be a single portion or may include at least two portions that are sealed to each other. The other one of the two portions may include a portion (e.g., a second portion) extending from the first portion of the first plate in a direction away from the vacuum space or extending in an inner direction of the vacuum space. As a second example, the plate may include at least two layers connected to each other in a thickness direction of the plate. Any one of the two layers may include a layer (e.g., the first portion) defining the vacuum space. The other one of the two layers may include a portion (e.g., the second portion) provided in an external space (e.g., a first space and a second space) of the vacuum space. In this case, the second portion may be defined as an outer cover of the plate. The other one of the two layers may include a portion (e.g., the second portion) provided in the vacuum space. In this case, the second portion may be defined as an inner cover of the plate.

The plate may include a first plate 10 and a second plate 20. One surface of the first plate (the inner surface of the first plate) provides a wall defining the vacuum space, and the other surface (the outer surface of the first plate) of the first plate A wall defining the first space may be provided. The first space may be a space provided in the vicinity of the first plate, a space defined by the apparatus, or an internal space of the apparatus. In this case, the first plate may be referred to as an inner case. When the first plate and the additional member define the internal space, the first plate and the additional member may be referred to as an inner case. The inner case may include two or more layers. In this case, one of the plurality of layers may be referred to as an inner panel. One surface of the second plate (the inner surface of the second plate) provides a wall defining the vacuum space, and the other surface (the outer surface of the first plate) of the second plate A wall defining the second space may be provided. The second space may be a space provided in vicinity of the second plate, another space defined by the apparatus, or an external space of the apparatus. In this case, the second plate may be referred to as an outer case. When the second plate and the additional member define the external space, the second plate and the additional member may be referred to as an outer case. The outer case may include two or more layers. In this case, one of the plurality of layers may be referred to as an outer panel. The second space may be a space having a temperature higher than that of the first space or a space having a temperature lower than that of the first space. Optionally, the plate may include a side plate 15. In FIG. 2, the side plate may also perform a function of a conductive resistance sheet 60 to be described later, according to the disposition of the side plate. The side plate may include a portion extending in a height direction of a space defined between the first plate and the second plate or a portion extending in a height direction of the vacuum space. One surface of the side plate may provide a wall defining the vacuum space, and the other surface of the side plate may provide a wall defining an external space of the vacuum space. The external space of the vacuum space may be at least one of the first space or the second space or a space in which another adiabatic body to be described later is disposed. The side plate may be integrally provided by extending at least one of the first plate or the second plate or a separate component connected to at least one of the first plate or the second plate.

The plate may optionally include a curved portion. In the present disclosure, the plate including a curved portion may be referred to as a bent plate. The curved portion may include at least one of the first plate, the second plate, the side plate, between the first plate and the second plate, between the first plate and the side plate, or between the second plate and the side plate. The plate may include at least one of a first curved portion or a second curved portion, an example of which is as follows. First, the side plate may include the first curved portion. A portion of the first curved portion may include a portion connected to the first plate. Another portion of the first curved portion may include a portion connected to the second curved portion. In this case, a curvature radius of each of the first curved portion and the second curved portion may be large. The other portion of the first curved portion may be connected to an additional straight portion or an additional curved portion, which are provided between the first curved portion and the second curved portion. In this case, a curvature radius of each of the first curved portion and the second curved portion may be small. Second, the side plate may include the second curved portion. A portion of the second curved portion may include a portion connected to the second plate. The other portion of the second curved portion may include a portion connected to the first curved portion. In this case, a curvature radius of each of the first curved portion and the second curved portion may be large. The other portion of the second curved portion may be connected to an additional straight portion or an additional curved portion, which are provided between the first curved portion and the second curved portion. In this case, a curvature radius of each of the first curved portion and the second curved portion may be small. Here, the straight portion may be defined as a portion having a curvature radius greater than that of the curved portion. The straight portion may be understood as a portion having a perfect plane or a curvature radius greater than that of the curved portion. Third, the first plate may include the first curved portion. A portion of the first curved portion may include a portion connected to the side plate. A portion connected to the side plate may be provided at a position that is away from the second plate at a portion at which the first plate extends in the longitudinal direction of the vacuum space. Fourth, the second plate may include the second curved portion. A portion of the second curved portion may include a portion connected to the side plate. A portion connected to the side plate may be provided at a position that is away from the first plate at a portion at which the second plate extends in the longitudinal direction of the vacuum space. The present disclosure may include a combination of any one of the first and second examples described above and any one of the third and fourth examples described above.

In the present disclosure, the vacuum space 50 may be defined as a third space. The vacuum space may be a space in which a vacuum pressure is maintained. In the present disclosure, the expression that a vacuum degree of A is higher than that of B means that a vacuum pressure of A is lower than that of B.

In the present disclosure, the seal 61 may be a portion provided between the first plate and the second plate. Examples of sealing are as follows. The present disclosure may be any one of the following examples or a combination of two or more examples. The sealing may include fusion welding for coupling the plurality of objects by melting at least a portion of the plurality of objects. For example, the first plate and the second plate may be welded by laser welding in a state in which a melting bond such as a filler metal is not interposed therebetween, a portion of the first and second plates and a portion of the component coupling portion may be welded by high-frequency brazing or the like, or a plurality of objects may be welded by a melting bond that generates heat. The sealing may include pressure welding for coupling the plurality of objects by a mechanical pressure applied to at least a portion of the plurality of objects. For example, as a component connected to the component coupling portion, an object made of a material having a degree of deformation resistance less than that of the plate may be pressure-welded by a method such as pinch-off.

A machine room 8 may be optionally provided outside the vacuum adiabatic body. The machine room may be defined as a space in which components connected to the cold source are accommodated. Optionally, the vacuum adiabatic body may include a port 40. The port may be provided at any one side of the vacuum adiabatic body to discharge air of the vacuum space 50. Optionally, the vacuum adiabatic body may include a conduit 64 passing through the vacuum space 50 to install components connected to the first space and the second space.

FIG. 3 is a view illustrating an example of a support that maintains the vacuum space. An example of the support is as follows. The present disclosure may be any one of the following examples or a combination of two or more examples.

The supports 30, 31, 33, and 35 may be provided to support at least a portion of the plate and a heat transfer resistor to be described later, thereby reducing deformation of at least some of the vacuum space 50, the plate, and the heat transfer resistor to be described later due to external force. The external force may include at least one of a vacuum pressure or external force excluding the vacuum pressure. When the deformation occurs in a direction in which a height of the vacuum space is lower, the support may reduce an increase in at least one of radiant heat conduction, gas heat conduction, surface heat conduction, or support heat conduction, which will be described later. The support may be an object provided to maintain a gap between the first plate and the second plate or an object provided to support the heat transfer resistor. The support may have a degree of deformation resistance greater than that of the plate or be provided to a portion having weak degree of deformation resistance among portions constituting the vacuum adiabatic body, the apparatus having the vacuum adiabatic body, and the wall having the vacuum adiabatic body. According to an embodiment, a degree of deformation resistance represents a degree to which an object resists deformation due to external force applied to the object and is a value determined by a shape including a thickness of the object, a material of the object, a processing method of the object, and the like. Examples of the portions having the weak degree of deformation resistance include the vicinity of the curved portion defined by the plate, at least a portion of the curved portion, the vicinity of an opening defined in the body of the apparatus, which is provided by the plate, or at least a portion of the opening. The support may be disposed to surround at least a portion of the curved portion or the opening or may be provided to correspond to the shape of the curved portion or the opening. However, it is not excluded that the support is provided in other portions. The opening may be understood as a portion of the apparatus including the body and the door capable of opening or closing the opening defined in the body.

An example in which the support is provided to support the plate is as follows. First, at least a portion of the support may be provided in a space defined inside the plate. The plate may include a portion including a plurality of layers, and the support may be provided between the plurality of layers. Optionally, the support may be provided to be connected to at least a portion of the plurality of layers or be provided to support at least a portion of the plurality of layers. Second, at least a portion of the support may be provided to be connected to a surface defined on the outside of the plate. The support may be provided in the vacuum space or an external space of the vacuum space. For example, the plate may include a plurality of layers, and the support may be provided as any one of the plurality of layers. Optionally, the support may be provided to support the other one of the plurality of layers. For example, the plate may include a plurality of portions extending in the longitudinal direction, and the support may be provided as any one of the plurality of portions. Optionally, the support may be provided to support the other one of the plurality of parts. As further another example, the support may be provided in the vacuum space or the external space of the vacuum space as a separate component, which is distinguished from the plate. Optionally, the support may be provided to support at least a portion of a surface defined on the outside of the plate. Optionally, the support may be provided to support one surface of the first plate and one surface of the second plate, and one surface of the first plate and one surface of the second plate may be provided to face each other. Third, the support may be provided to be integrated with the plate. An example in which the support is provided to support the heat transfer resistor may be understood instead of the example in which the support is provided to support the plate. A duplicated description will be omitted.

An example of the support in which heat transfer through the support is designed to be reduced is as follows. First, at least a portion of the components disposed in the vicinity of the support may be provided so as not to be in contact with the support or provided in an empty space provided by the support. Examples of the components include a tube or component connected to the heat transfer resistor to be described later, an exhaust port, a getter port, a tube or component passing through the vacuum space, or a tube or component of which at least a portion is disposed in the vacuum space. Examples of the empty space may include an empty space provided in the support, an empty space provided between the plurality of supports, and an empty space provided between the support and a separate component that is distinguished from the support. Optionally, at least a portion of the component may be disposed in a through-hole defined in the support, be disposed between the plurality of bars, be disposed between the plurality of connection plates, or be disposed between the plurality of support plates. Optionally, at least a portion of the component may be disposed in a spaced space between the plurality bars, be disposed in a spaced space between the plurality of connection plates, or be disposed in a spaced space between the plurality of support plates. Second, the adiabatic body may be provided on at least a portion of the support or in the vicinity of at least a portion of the support. The adiabatic body may be provided to be in contact with the support or provided so as not to be in contact with the support. The adiabatic body may be provided at a portion in which the support and the plate are in contact with each other. The adiabatic body may be provided on at least a portion of one surface and the other surface of the support or be provided to cover at least a portion of one surface and the other surface of the support. The adiabatic body may be provided on at least a portion of a periphery of one surface and a periphery of the other surface of the support or be provided to cover at least a portion of a periphery of one surface and a periphery of the other surface of the support. The support may include a plurality of bars, and the adiabatic body may be disposed on an area from a point at which any one of the plurality of bars is disposed to a midpoint between the one bar and the surrounding bars. Third, when cold is transferred through the support, a heat source may be disposed at a position at which the heat adiabatic body described in the second example is disposed. When a temperature of the first space is lower than a temperature of the second space, the heat source may be disposed on the second plate or in the vicinity of the second plate. When heat is transmitted through the support, a cold source may be disposed at a position at which the heat adiabatic body described in the second example is disposed. When a temperature of the first space is higher than a temperature of the second space, the cold source may be disposed on the second plate or in the vicinity of the second plate. As fourth example, the support may include a portion having heat transfer resistance higher than a metal or a portion having heat transfer resistance higher than the plate. The support may include a portion having heat transfer resistance less than that of another adiabatic body. The support may include at least one of a non-metal material, PPS, and glass fiber (GF), low outgassing PC, PPS, or LCP. This is done for a reason in which high compressive strength, low outgassing, and a water absorption rate, low thermal conductivity, high compressive strength at a high temperature, and excellent workability are being capable of obtained.

Examples of the support may be the bars 30 and 31, the connection plate 35, the support plate 35, a porous material 33, and a filler 33. In this embodiment, the support may include any one of the above examples, or an example in which at least two examples are combined. As first example, the support may include bars 30 and 31. The bar may include a portion extending in a direction in which the first plate and the second plate are connected to each other to support a gap between the first plate and the second plate. The bar may include a portion extending in a height direction of the vacuum space and a portion extending in a direction that is substantially perpendicular to the direction in which the plate extends. The bar may be provided to support only one of the first plate and the second plate or may be provided both the first plate and the second plate. For example, one surface of the bar may be provided to support a portion of the plate, and the other surface of the bar may be provided so as not to be in contact with the other portion of the plate. As another example, one surface of the bar may be provided to support at least a portion of the plate, and the other surface of the bar may be provided to support the other portion of the plate. The support may include a bar having an empty space therein or a plurality of bars, and an empty space are provided between the plurality of bars. In addition, the support may include a bar, and the bar may be disposed to provide an empty space between the bar and a separate component that is distinguished from the bar. The support may selectively include a connection plate 35 including a portion connected to the bar or a portion connecting the plurality of bars to each other. The connection plate may include a portion extending in the longitudinal direction of the vacuum space or a portion extending in the direction in which the plate extends. An XZ-plane cross-sectional area of the connection plate may be greater than an XZ-plane cross-sectional area of the bar. The connection plate may be provided on at least one of one surface and the other surface of the bar or may be provided between one surface and the other surface of the bar. At least one of one surface and the other surface of the bar may be a surface on which the bar supports the plate. The shape of the connection plate is not limited. The support may include a connection plate having an empty space therein or a plurality of connection plates, and an empty space are provided between the plurality of connection plates. In addition, the support may include a connection plate, and the connection plate may be disposed to provide an empty space between the connection plate and a separate component that is distinguished from the connection plate. As a second example, the support may include a support plate 35. The support plate may include a portion extending in the longitudinal direction of the vacuum space or a portion extending in the direction in which the plate extends. The support plate may be provided to support only one of the first plate and the second plate or may be provided both the first plate and the second plate. For example, one surface of the support plate may be provided to support a portion of the plate, and the other surface of the support plate may be provided so as not to be in contact with the other portion of the plate. As another example, one surface of the support plate may be provided to support at least a portion of the plate, and the other surface of the support plate may be provided to support the other portion of the plate. A cross-sectional shape of the support plate is not limited. The support may include a support plate having an empty space therein or a plurality of support plates, and an empty space are provided between the plurality of support plates. In addition, the support may include a support plate, and the support plate may be disposed to provide an empty space between the support plate and a separate component that is distinguished from the support plate. As a third example, the support may include a porous material 33 or a filler 33. The inside of the vacuum space may be supported by the porous material or the filler. The inside of the vacuum space may be completely filled by the porous material or the filler. The support may include a plurality of porous materials or a plurality of fillers, and the plurality of porous materials or the plurality of fillers may be disposed to be in contact with each other. When an empty space is provided inside the porous material, provided between the plurality of porous materials, or provided between the porous material and a separate component that is distinguished from the porous material, the porous material may be understood as including any one of the aforementioned bar, connection plate, and support plate. When an empty space is provided inside the filler, provided between the plurality of fillers, or provided between the filler and a separate component that is distinguished from the filler, the filler may be understood as including any one of the aforementioned bar, connection plate, and support plate. The support according to the present disclosure may include any one of the above examples or an example in which two or more examples are combined.

Referring to FIG. 3*a*, as an embodiment, the support may include a bar 31 and a connection plate and support plate 35. The connection plate and the supporting plate may be designed separately. Referring to FIG. 3*b*, as an embodiment, the support may include a bar 31, a connection plate and support plate 35, and a porous material 33 filled in the vacuum space. The porous material 33 may have emissivity greater than that of stainless steel, which is a material of the plate, but since the vacuum space is filled, resistance efficiency of radiant heat transfer is high. The porous material may also function as a heat transfer resistor to be described later. More preferably, the porous material may perform a function of a radiation resistance sheet to be described later. Referring to FIG. 3*c*, as an embodiment, the support may include a porous material 33 or a filler 33. The porous material 33 and the filler may be provided in a compressed state to maintain a gap between the vacuum space. The film 34 may be provided in a state in which a hole is punched as, for example, a PE material. The porous material 33 or the filler may perform both a function of the heat transfer resistor and a function of the support, which will be described later. More preferably, the porous material may perform both a function of the radiation resistance sheet and a function of the support to be described later.

FIG. 4 is a view for explaining an example of the vacuum adiabatic body based on heat transfer resistors 32, 33, 60, and 63 (e.g., thermal insulator and a heat transfer resistance body). The vacuum adiabatic body according to the present disclosure may optionally include a heat transfer resistor. An example of the heat transfer resistor is as follows. The present disclosure may be any one of the following examples or a combination of two or more examples.

The heat transfer resistors 32, 33, 60, and 63 may be objects that reduce an amount of heat transfer between the first space and the second space or objects that reduce an amount of heat transfer between the first plate and the second plate. The heat transfer resistor may be disposed on a heat transfer path defined between the first space and the second space or be disposed on a heat transfer path formed between the first plate and the second plate. The heat transfer resistor may include a portion extending in a direction along a wall defining the vacuum space or a portion extending in a direction in which the plate extends. Optionally, the heat transfer resistor may include a portion extending from the plate in a direction away from the vacuum space. The heat transfer resistor may be provided on at least a portion of the periphery of the first plate or the periphery of the second plate or be provided on at least a portion of an edge of the first plate or an edge of the second plate. The heat transfer resistor may be provided at a portion, in which the through-hole is defined, or provided as a tube connected to the through-hole. A separate tube or a separate component that is distinguished from the tube may be disposed inside the tube. The heat transfer resistor may include a portion having heat transfer resistance greater than that of the plate. In this case, adiabatic performance of the vacuum adiabatic body may be further improved. A shield 62 may be provided on the outside of the heat transfer resistor to be insulated. The inside of the heat transfer resistor may be insulated by the vacuum space. The shield may be provided as a porous material or a filler that is in contact with the inside of the heat transfer resistor. The shield may be an adiabatic structure that is exemplified by a separate gasket placed outside the inside of the heat transfer resistor. The heat transfer resistor may be a wall defining the third space.

An example in which the heat transfer resistor is connected to the plate may be understood as replacing the support with the heat transfer resistor in an example in which the support is provided to support the plate. A duplicate description will be omitted. The example in which the heat transfer resistor is connected to the support may be understood as replacing the plate with the support in the example in which the heat transfer resistor is connected to the plate. A duplicate description will be omitted. The example of reducing heat transfer via the heat transfer body may be applied as a substitute the example of reducing the heat transfer via the support, and thus, the same explanation will be omitted.

In the present disclosure, the heat transfer resistor may be one of a radiation resistance sheet 32, a porous material 33, a filler 33, and a conductive resistance sheet. In the present disclosure, the heat transfer resistor may include a combination of at least two of the radiation resistance sheet 32, the porous material 33, the filler 33, and the conductive resistance sheet. As a first example, the heat transfer resistor may include a radiation resistance sheet 32. The radiation resistance sheet may include a portion having heat transfer resistance greater than that of the plate, and the heat transfer resistance may be a degree of resistance to heat transfer by radiation. The support may perform a function of the radiation resistance sheet together. A conductive resistance sheet to be described later may perform the function of the radiation resistance sheet together. As a second example, the heat transfer resistor may include conduction resistance sheets 60 and 63. The conductive resistance sheet may include a portion having heat transfer resistance greater than that of the plate, and the heat transfer resistance may be a degree of resistance to heat transfer by conduction. For example, the conductive resistance sheet may have a thickness less than that of at least a portion of the plate. As another example, the conductive resistance sheet may include one end and the other end, and a length of the conductive resistance sheet may be longer than a straight distance connecting one end of the conductive resistance sheet to the other end of the conductive resistance sheet. As another example, the conductive resistance sheet may include a material having resistance to heat transfer greater than that of the plate by conduction. As another example, the heat transfer resistor may include a portion having a curvature radius less than that of the plate.

Referring to FIG. 4a, for example, a conductive resistance sheet may be provided on a side plate connecting the first plate to the second plate. Referring to FIG. 4b, for example, a conductive resistance sheet 60 may be provided on at least a portion of the first plate and the second plate. A connection frame 70 may be further provided outside the conductive resistance sheet. The connection frame may be a portion from which the first plate or the second plate extends or a portion from which the side plate extends. Optionally, the connection frame 70 may include a portion at which a component for sealing the door and the body and a component disposed outside the vacuum space such as the exhaust port and the getter port, which are required for the exhaust process, are connected to each other. Referring to FIG. 4c, for example, a conductive resistance sheet may be provided on a side plate connecting the first plate to the second plate. The conductive resistance sheet may be installed in a through-hole passing through the vacuum space. The conduit 64 may be provided separately outside the conductive resistance sheet. The conductive resistance sheet may be provided in a pleated shape. Through this, the heat transfer path may be lengthened, and deformation due to a pressure difference may be prevented. A separate shielding member for insulating the conductive resistance sheet 63 may also be provided. The conductive resistance sheet may include a portion having a degree of deformation resistance less than that of at least one of the plate, the radiation resistance sheet, or the support. The radiation resistance sheet may include a portion having a degree of deformation resistance less than that of at least one of the plate or the support. The plate may include a portion having a degree of deformation resistance less than that of the support. The conductive resistance sheet may include a portion having conductive heat transfer resistance greater than that of at least one of the plate, the radiation resistance sheet, or the support. The radiation resistance sheet may include a portion having radiation heat transfer resistance greater than that of at least one of the plate, the conductive resistance sheet, or the support. The support may include a portion having heat transfer resistance greater than that of the plate. For example, at least one of the plate, the conductive resistance sheet, or the connection frame may include stainless steel material, the radiation resistance sheet may include aluminum, and the support may include a resin material.

FIG. 5 is a graph for observing a process of exhausting the inside of the vacuum adiabatic body with a time and pressure when the support is used. An example of a vacuum adiabatic body vacuum exhaust process vacuum is as follows. The present disclosure may be any one of the following examples or a combination of two or more examples.

While the exhaust process is being performed, an outgassing process, which is a process in which a gas of the vacuum space is discharged, or a potential gas remaining in the components of the vacuum adiabatic body is discharged, may be performed. As an example of the outgassing process, the exhaust process may include at least one of heating or drying the vacuum adiabatic body, providing a vacuum pressure to the vacuum adiabatic body, or providing a getter to the vacuum adiabatic body. In this case, it is possible to promote the vaporization and exhaust of the potential gas remaining in the component provided in the vacuum space.

The exhaust process may include a process of cooling the vacuum adiabatic body. The cooling process may be performed after the process of heating or drying the vacuum adiabatic body is performed. The process of heating or drying the vacuum adiabatic body process of providing the vacuum pressure to the vacuum adiabatic body may be performed together. The process of heating or drying the vacuum adiabatic body and the process of providing the getter to the vacuum adiabatic body may be performed together. After the process of heating or drying the vacuum adiabatic body is performed, the process of cooling the vacuum adiabatic body may be performed. The process of providing the vacuum pressure to the vacuum adiabatic body and the process of providing the getter to the vacuum adiabatic body may be performed so as not to overlap each other. For example, after the process of providing the vacuum pressure to the vacuum adiabatic body is performed, the process of providing the getter to the vacuum adiabatic body may be performed. When the vacuum pressure is provided to the vacuum adiabatic body, a pressure of the vacuum space may drop to a certain level and then no longer drop. Here, after stopping the process of providing the vacuum pressure to the vacuum adiabatic body, the getter may be input. As an example of stopping the process of providing the vacuum pressure to the vacuum adiabatic body, an operation of a vacuum pump connected to the vacuum space may be stopped. When inputting the getter, the process of heating or drying the vacuum adiabatic body may be performed together. Through this, the outgassing may be promoted. As another example, after the process of providing the getter to the vacuum adiabatic body is performed, the process of providing the vacuum pressure to the vacuum adiabatic body may be performed.

The time during which the vacuum adiabatic body vacuum exhaust process is performed may be referred to as a vacuum exhaust time. The vacuum exhaust time includes at least one of a time $\Delta 1$ during which the process of heating or drying the vacuum adiabatic body is performed, a time $\Delta t2$ during which the process of maintaining the getter in the vacuum adiabatic body is performed, of a time $\Delta t3$ during which the process of cooling the vacuum adiabatic body is performed. Examples of times $\Delta t1$, $\Delta t2$, and $\Delta t3$ are as follows. The present disclosure may be any one of the following examples or a combination of two or more examples. In the vacuum adiabatic body vacuum exhaust process, the time $\Delta t1$ may be a time $t1a$ or more and a time $t1b$ or less. As a first example, the time $t1a$ may be greater than or equal to about 0.2 hr and less than or equal to about 0.5 hr. The time $t1b$ may be greater than or equal to about 1 hr and less than or equal to about 24.0 hr. The time $\Delta t1$ may be about 0.3 hr or more and about 12.0 hr or less. The time $\Delta t1$ may be about 0.4 hr or more and about 8.0 hr or less. The time $\Delta t1$ may be about 0.5 hr or more and about 4.0 hr or less. In this case, even if the $\Delta t1$ is kept as short as possible, the sufficient outgassing may be applied to the vacuum adiabatic body. For example, this case may include a case in which a component of the vacuum adiabatic body, which is exposed to the vacuum space, among the components of the vacuum adiabatic body, has an outgassing rate (%) less than that of any one of the component of the vacuum adiabatic body, which is exposed to the external space of the vacuum space. Specifically, the component exposed to the vacuum space may include a portion having a outgassing rate less than that of a thermoplastic polymer. More specifically, the support or the radiation resistance sheet may be disposed in the vacuum space, and the outgassing rate of the support may be less than that of the thermoplastic plastic. As another example, this case may include a case in which a component of the vacuum adiabatic body, which is exposed to the vacuum space, among the components of the vacuum adiabatic body, has a max operating temperature (° C.) greater than that of any one of the component of the vacuum adiabatic body, which is exposed to the external space of the vacuum space. In this case, the vacuum adiabatic body may be heated to a higher temperature to increase in outgassing rate. For example, the component exposed to the vacuum space may include a portion having an operating temperature greater than that of the thermoplastic polymer. As a more specific example, the support or the radiation resistance sheet may be disposed in the vacuum space, and a use temperature of the support may be higher than that of the thermoplastic plastic. As another example, among the components of the vacuum adiabatic body, the component exposed to the vacuum space may contain more metallic portion than a non-metallic portion. That is, a mass of the metallic portion may be greater than a mass of the non-metallic portion, a volume of the metallic portion may be greater than a volume of the non-metallic portion, or an area of the metallic portion exposed to the vacuum space may be greater than an area exposed to the non-metallic portion of the vacuum space. When the components exposed to the vacuum space are provided in plurality, the sum of the volume of the metal material included in the first component and the volume of the metal material included in the second component may be greater than that of the volume of the non-metal material included in the first component and the volume of the non-metal material included in the second component. When the components exposed to the vacuum space are provided in plurality, the sum of the mass of the metal material included in the first component and the mass of the metal material included in the second component may be greater than that of the mass of the non-metal material included in the first component and the mass of the non-metal material included in the second component. When the components exposed to the vacuum space are provided in plurality, the sum of the area of the metal material, which is exposed to the vacuum space and included in the first component, and an area of the metal material, which is exposed to the vacuum space and included in the second component, may be greater than that of the area of the non-metal material, which is exposed to the vacuum space and included in the first component, and an area of the non-metal material, which is exposed to the vacuum space and included in the second component. As a second example, the time $t1a$ may be greater than or equal to about 0.5 hr and less than or equal to about 1 hr. The time $t1b$ may be greater than or equal to about 24.0 hr and less than or equal to about 65 hr. The time $\Delta t1$ may be about 1.0 hr or more and about 48.0 hr or less. The time $\Delta t1$ may be about 2 hr or more and about 24.0 hr or less. The time $\Delta t1$ may be about 3 hr or more and about 12.0 hr or less. In this case, it may be the vacuum adiabatic body that needs to maintain the $\Delta t1$ as long as possible. In this case, a case opposite to the examples described in the first example or a case in which the component exposed to the vacuum space is made of a thermoplastic material may be an example. A duplicated description will be omitted. In the vacuum adiabatic body vacuum exhaust process, the time $\Delta t1$ may be a time $t1a$ or more and a time $t1b$ or less. The time $t2a$ may be greater than or equal to about 0.1 hr and less than or equal to about 0.3 hr. The time $t2b$ may be greater than or equal to about 1 hr and less than or equal to about 5.0 hr. The time $\Delta t2$ may be about 0.2 hr or more and about 3.0 hr or less. The time $\Delta t2$ may be about 0.3 hr or more and about 2.0 hr or less. The time $\Delta t2$ may be about 0.5 hr or more and about 1.5 hr or less. In this case, even if the time $\Delta t2$ is kept as short as possible, the sufficient outgassing through the getter may be applied to the vacuum adiabatic body. In the vacuum adiabatic body vacuum exhaust process, the time $\Delta t3$ may be a time $t3a$ or more and a time $t3b$ or less. The time $t2a$ may be greater than or equal to about 0.2 hr and less than or equal to about 0.8 hr. The time $t2b$ may be greater than or equal to about 1 hr and less than or equal to about 65.0 hr. The tine $\Delta t3$ may be about 0.2 hr or more and about 48.0 hr or less. The time $\Delta t3$ may be about 0.3 hr or more and about 24.0 hr or less. The time $\Delta t3$ may be about 0.4 hr or more and about 12.0 hr or less. The time $\Delta t3$ may be about 0.5 hr or more and about 5.0 hr or less. After the heating or drying process is performed during the exhaust process, the cooling process may be performed. For example, when the heating or drying process is performed for a long time, the time $\Delta t3$ may be long. The vacuum adiabatic body according to the present disclosure may be manufactured so that the time $\Delta t1$ is greater than the time $\Delta t2$, the time $\Delta t1$ is less than or equal to the time $\Delta t3$, or the time $\Delta t3$ is greater than the time $\Delta t2$. The following relational expression is satisfied: $\Delta t2 < \Delta t1 \leq \Delta t3$. The vacuum adiabatic body according to an embodiment may be manufactured so that the relational expression: $\Delta t1 + \Delta t2 + \Delta t3$ may be greater than or equal to about 0.3 hr and less than or equal to about 70 hr, be greater than or equal to about 1 hr and less than or equal to about 65 hr, or be greater than or equal to about 2 hr and less than or equal to about 24 hr. The relational expression: $\Delta t1 + \Delta t2 + \Delta t3$ may be manufactured to be greater than or equal to about 3 hr and less than or equal to about 6 hr.

An example of the vacuum pressure condition during the exhaust process is as follows. The present disclosure may be any one of the following examples or a combination of two or more examples. A minimum value of the vacuum pressure in the vacuum space during the exhaust process may be greater than about 1.8E-6 Torr. The minimum value of the vacuum pressure may be greater than about 1.8E-6 Torr and less than or equal to about 1.0E-4 Torr, be greater than about 0.5E-6 Torr and less than or equal to about 1.0E-4 Torr, or be greater than about 0.5E-6 Torr and less than or equal to about 0.5E-5 Torr. The minimum value of the vacuum pressure may be greater than about 0.5E-6 Torr and less than about 1.0E-5 Torr. As such, the limitation in which the minimum value of the vacuum pressure provided during the exhaust process is because, even if the pressure is reduced through the vacuum pump during the exhaust process, the decrease in vacuum pressure is slowed below a certain level. As an embodiment, after the exhaust process is performed, the vacuum pressure of the vacuum space may be maintained at a pressure greater than or equal to about 1.0E-5 Torr and less than or equal to about 5.0E-1 Torr. The maintained vacuum pressure may be greater than or equal to about 1.0E-5 Torr and less than or equal to about 1.0E-1 Torr, be greater than or equal to about 1.0E-5 Torr and less than or equal to about 1.0E-2 Torr, be greater than or equal to about 1.0E-4 Torr and less than or equal to about 1.0E-2 Torr, or be greater than or equal to about 1.0E-5 Torr and less than or equal to about 1.0E-3 Torr. As a result of predicting the change in vacuum pressure with an accelerated experiment of two example products, one product may be provided so that the vacuum pressure is maintained below about 1.0E-04 Torr even after about 16.3 years, and the other product may be provided so that the vacuum pressure is maintained below about 1.0E-04 Torr even after about 17.8 years. As described above, the vacuum pressure of the vacuum adiabatic body may be used industrially only when it is maintained below a predetermined level even if there is a change over time.

FIG. 5a is a graph of an elapsing time and pressure in the exhaust process according to an example, and FIG. 5b is a view explaining results of a vacuum maintenance test in the acceleration experiment of the vacuum adiabatic body of the refrigerator having an internal volume of about 128 liters. Referring to FIG. 5b, it is seen that the vacuum pressure gradually increases according to the aging. For example, it is confirmed that the vacuum pressure is about 6.7E-04 Torr after about 4.7 years, about 1.7E-03 Torr after about 10 years, and about 1.0E-02 Torr after about 59 years. According to these experimental results, it is confirmed that the vacuum adiabatic body according to the embodiment is sufficiently industrially applicable.

FIG. 6 is a graph illustrating results obtained by comparing the vacuum pressure with gas conductivity. Referring to FIG. 6, gas conductivity with respect to the vacuum pressure depending on a size of the gap in the vacuum space 50 was represented as a graph of effective heat transfer coefficient (eK). The effective heat transfer coefficient (eK) was measured when the gap in the vacuum space 50 has three values of about 3 mm, about 4.5 mm, and about 9 mm. The gap in the vacuum space 50 is defined as follows. When the radiation resistance sheet 32 exists inside surface vacuum space 50, the gap is a distance between the radiation resistance sheet 32 and the plate adjacent thereto. When the radiation resistance sheet 32 does not exist inside surface vacuum space 50, the gap is a distance between the first and second plates. It was seen that, since the size of the gap is small at a point corresponding to a typical effective heat transfer coefficient of about 0.0196 W/mK, which is provided to an adiabatic material formed by foaming polyurethane, the vacuum pressure is about 5.0E-1 Torr even when the size of the gap is about 3 mm. Meanwhile, it was seen that the point at which reduction in adiabatic effect caused by the gas conduction heat is saturated even though the vacuum pressure decreases is a point at which the vacuum pressure is approximately 4.5E-3 Torr. The vacuum pressure of about 4.5E-3 Torr may be defined as the point at which the reduction in adiabatic effect caused by the gas conduction heat is saturated. Also, when the effective heat transfer coefficient is about 0.01 W/mK, the vacuum pressure is about 1.2E-2 Torr. An example of a range of the vacuum pressure in the vacuum space according to the gap is presented. The support may include at least one of a bar, a connection plate, or a support plate. In this case, when the gap of the vacuum space is greater than or equal to about 3 mm, the vacuum pressure may be greater than or equal to A and less than about 5E-1 Torr, or be greater than about 2.65E-1 Torr and less than about 5E-1 Torr. As another example, the support may include at least one of a bar, a connection plate, or a support plate. In this case, when the gap of the vacuum space is greater than or equal to about 4.5 mm, the vacuum pressure may be greater than or equal to A and less than about 3E-1 Torr, or be greater than about 1.2E-2 Torr and less than about 5E-1 Torr. As another example, the support may include at least one of a bar, a connection plate, or a support plate, and when the gap of the vacuum space is greater than or equal to about 9 mm, the vacuum pressure may be greater than or equal to A and less than about $1.0 \times 10^{-1}$ Torr or be greater than about 4.5E-3 Torr and less than about 5E-1 Torr. Here, the A may be greater than or equal to about $1.0 \times 10^{-6}$ Torr and less than or equal to about 1.0E-5 Torr. The A may be greater than or equal to about $1.0 \times 10^{-5}$ Torr and less than or equal to about 1.0E-4 Torr. When the support includes a porous material or a filler, the vacuum pressure may be greater than or equal to about 4.7E-2 Torr and less than or equal to about 5E-1 Torr. In this case, it is understood that the size of the gap ranges from several micrometers to several hundreds of micrometers. When the support and the porous material are provided together in the vacuum space, a vacuum pressure may be created and used, which is middle between the vacuum pressure when only the support is used and the vacuum pressure when only the porous material is used.

FIG. 7 is a view illustrating various examples of the vacuum space. The present disclosure may be any one of the following examples or a combination of two or more examples.

Referring to FIG. 7, the vacuum adiabatic body according to the present disclosure may include a vacuum space. The vacuum space 50 may include a first vacuum space extending in a first direction (e.g., X-axis) and having a predetermined height. The vacuum space 50 may optionally include a second vacuum space (hereinafter, referred to as a vacuum space expansion portion) different from the first vacuum space in at least one of the height or the direction. The vacuum space expansion portion may be provided by allowing at least one of the first and second plates or the side plate to extend. In this case, the heat transfer resistance may increase by lengthening a heat conduction path along the plate. The vacuum space expansion portion in which the second plate extends may reinforce adiabatic performance of a front portion of the vacuum adiabatic body. The vacuum space expansion portion in which the second plate extends may reinforce adiabatic performance of a rear portion of the vacuum adiabatic body, and the vacuum space expansion portion in which the side plate extends may reinforce adiabatic performance of a side portion of the vacuum adiabatic body. Referring to FIG. 7a, the second plate may extend to provide the vacuum space expansion portion 51. The second plate may include a second portion 202 extending from a first portion 201 defining the vacuum space 50 and the vacuum space expansion portion 51. The second portion 202 of the second plate may branch a heat conduction path along the second plate to increase in heat transfer resistance. Referring to FIG. 7b, the side plate may extend to provide the vacuum space expansion portion. The side plate may include a second portion 152 extending from a first portion 151 defining the vacuum space 50 and the vacuum space extension portion 51. The second portion of the side plate may branch the heat conduction path along the side plate to improve the adiabatic performance. The first and second portions 151 and 152 of the side plate may branch the heat conduction path to increase in heat transfer resistance. Referring to FIG. 7c, the first plate may extend to provide the vacuum space expansion portion. The first plate may include a second portion 102 extending from the first portion 101 defining the vacuum space 50 and the vacuum space expansion portion 51. The second portion of the first plate may branch the heat conduction path along the second plate to increase in heat transfer resistance. Referring to FIG. 7d, the vacuum space expansion portion 51 may include an X-direction expansion portion 51a and a Y-direction expansion portion 51b of the vacuum space. The vacuum space expansion portion 51 may extend in a plurality of directions of the vacuum space 50. Thus, the adiabatic performance may be reinforced in multiple directions and may increase by lengthening the heat conduction path in the plurality of directions to improve the heat transfer resistance. The vacuum space expansion portion extending in the plurality of directions may further improve the adiabatic performance by branching the heat conduction path. Referring to FIG. 7e, the side plate may provide the vacuum space extension portion extending in the plurality of directions. The vacuum space expansion portion may reinforce the adiabatic performance of the side portion of the vacuum adiabatic body. Referring to FIG. 7f, the first plate may provide the vacuum space extension portion extending in the plurality of directions. The vacuum space expansion portion may reinforce the adiabatic performance of the side portion of the vacuum adiabatic body.

FIG. 8 is a view for explaining another adiabatic body. The present disclosure may be any one of the following examples or a combination of two or more examples. Referring to FIG. 8, the vacuum adiabatic body according to the present disclosure may optionally include another adiabatic body 90. Another adiabatic body may have a degree of vacuum less than that of the vacuum adiabatic body and be an object that does not include a portion having a vacuum state therein. The vacuum adiabatic body and another vacuum adiabatic body may be directly connected to each other or connected to each other through an intermedium. In this case, the intermedium may have a degree of vacuum less than that of at least one of the vacuum adiabatic body or another adiabatic body or may be an object that does not include a portion having the vacuum state therein. When the vacuum adiabatic body includes a portion in which the height of the vacuum adiabatic body is high and a portion in which the height of the vacuum adiabatic body is low, another adiabatic body may be disposed at a portion having the low height of the vacuum adiabatic body. Another adiabatic body may include a portion connected to at least a portion of the first and second plates and the side plate. Another adiabatic body may be supported on the plate or coupled or sealed. A degree of sealing between another adiabatic body and the plate may be lower than a degree of sealing between the plates. Another adiabatic body may include a cured adiabatic body (e.g., PU foaming solution) that is cured after being injected, a premolded resin, a peripheral adiabatic body, and a side panel. At least a portion of the plate may be provided to be disposed inside another adiabatic body. Another adiabatic body may include an empty space. The plate may be provided to be accommodated in the empty space. At least a portion of the plate may be provided to cover at least a portion of another adiabatic body. Another adiabatic body may include a member covering an outer surface thereof. The member may be at least a portion of the plate. Another adiabatic body may be an intermedium for connecting, supporting, bonding, or sealing the vacuum adiabatic body to the component. Another adiabatic body may be an intermedium for connecting, supporting, bonding, or sealing the vacuum adiabatic body to another vacuum adiabatic body. Another adiabatic body may include a portion connected to a component coupling portion provided on at least a portion of the plate. Another adiabatic body may include a portion connected to a cover covering another adiabatic body. The cover may be disposed between the first plate and the first space, between the second plate and the second space, or between the side plate and a space other than the vacuum space 50. For example, the cover may include a portion on which the component is mounted. As another example, the cover may include a portion that defines an outer appearance of another adiabatic body. Referring to FIGS. 8a to 8f, another adiabatic body may include a peripheral adiabatic body. The peripheral adiabatic body may be disposed on at least a portion of a periphery of the vacuum adiabatic body, a periphery of the first plate, a periphery of the second plate, and the side plate.

The peripheral adiabatic body disposed on the periphery of the first plate or the periphery of the second plate may extend to a portion at which the side plate is disposed or may extend to the outside of the side plate. The peripheral adiabatic body disposed on the side plate may extend to a portion at which the first plate or may extend to the outside of the first plate or the second plate. Referring to FIGS. 8g to 8h, another adiabatic body may include a central adiabatic body. The central adiabatic body may be disposed on at least a portion of a central portion of the vacuum adiabatic body, a central portion of the first plate, or a central portion of the second plate.

Referring to FIG. 8a, the peripheral adiabatic body 92 may be placed on the periphery of the first plate. The peripheral adiabatic body may be in contact with the first plate. The peripheral adiabatic body may be separated from the first plate or further extend from the first plate (indicated by dotted lines). The peripheral adiabatic body may improve the adiabatic performance of the periphery of the first plate. Referring to FIG. 8b, the peripheral adiabatic body may be placed on the periphery of the second plate. The peripheral adiabatic body may be in contact with the second plate. The peripheral adiabatic body may be separated from the second plate or further extend from the second plate (indicated by dotted lines). The periphery adiabatic body may improve the adiabatic performance of the periphery of the second plate. Referring to FIG. 8c, the peripheral adiabatic body may be disposed on the periphery of the side plate. The peripheral adiabatic body may be in contact with the side plate. The peripheral adiabatic body may be separated from the side plate or further extend from the side plate. The peripheral adiabatic body may improve the adiabatic performance of the periphery of the side plate Referring to FIG. 8d, the peripheral adiabatic body 92 may be disposed on the periphery of the first plate. The peripheral adiabatic body may be placed on the periphery of the first plate constituting the vacuum space expansion portion 51. The peripheral adiabatic body may be in contact with the first plate constituting the vacuum space extension portion. The peripheral adiabatic body may be separated from or further extend to the first plate constituting the vacuum space extension portion. The peripheral adiabatic body may improve the adiabatic performance of the periphery of the first plate constituting the vacuum space expansion portion. Referring to FIGS. 8e and 8f, in the peripheral adiabatic body, the vacuum space extension portion may be disposed on a periphery of the second plate or the side plate. The same explanation as in FIG. 8d may be applied. Referring to FIG. 8g, the central adiabatic body 91 may be placed on a central portion of the first plate. The central adiabatic body may improve adiabatic performance of the central portion of the first plate. Referring to FIG. 8h, the central adiabatic body may be disposed on the central portion of the second plate. The central adiabatic body may improve adiabatic performance of the central portion of the second plate.

FIG. 9 is a view for explaining a heat transfer path between first and second plates having different temperatures. An example of the heat transfer path is as follows. The present disclosure may be any one of the following examples or a combination of two or more examples.

The heat transfer path may pass through the extension portion at at least a portion of the first portion 101 of the first plate, the first portion 201 of the second plate, or the first portion 151 of the side plate. The first portion may include a portion defining the vacuum space. The extension portions 102, 152, and 202 may include portions extending in a direction away from the first portion. The extension portion may include a side portion of the vacuum adiabatic body, a side portion of the plate having a higher temperature among the first and second plates, or a portion extending toward the side portion of the vacuum space 50. The extension portion may include a front portion of the vacuum adiabatic body, a front portion of the plate having a higher temperature among the first and second plates, or a front portion extending in a direction away from the front portion of the vacuum space 50. Through this, it is possible to reduce generation of dew on the front portion. The vacuum adiabatic body or the vacuum space 50 may include first and second surfaces having different temperatures from each other. The temperature of the first surface may be lower than that of the second surface. For example, the first surface may be the first plate, and the second surface may be the second plate. The extension portion may extend in a direction away from the second surface or include a portion extending toward the first surface. The extension portion may include a portion, which is in contact with the second surface, or a portion extending in a state of being in contact with the second surface. The extension portion may include a portion extending to be spaced apart from the two surfaces. The extension portion may include a portion having heat transfer resistance greater than that of at least a portion of the plate or the first surface. The extension portion may include a plurality of portions extending in different directions. For example, the extension portion may include a second portion 202 of the second plate and a third portion 203 of the second plate. The third portion may also be provided on the first plate or the side plate. Through this, it is possible to increase in heat transfer resistance by lengthening the heat transfer path. In the extension portion, the above-described heat transfer resistor may be disposed. Another adiabatic body may be disposed outside the extending portion. Through this, the extension portion may reduce generation of dew on the second surface. Referring to FIG. 9a, the second plate may include the extension portion extending to the periphery of the second plate. Here, the extension portion may further include a portion extending backward. Referring to FIG. 9b, the side plate may include the extension portion extending to a periphery of the side plate. Here, the extension portion may be provided to have a length that is less than or equal to that of the extension portion of the second plate. Here, the extension portion may further include a portion extending backward. Referring to FIG. 9c, the first plate may include the extension portion extending to the periphery of the first plate. Here, the extension portion may extend to a length that is less than or equal to that of the extension portion of the second plate. Here, the extension portion may further include a portion extending backward.

FIG. 10 is a view for explaining a branch portion on the heat transfer path between first and second plates having different temperatures. An example of the branch portion is as follows. The present disclosure may be any one of the following examples or a combination of two or more examples.

Optionally, the heat transfer path may pass through portions 205, 153, and 104, each of which is branched from at least a portion of the first plate, the second plate, or the side plate. Here, the branched heat transfer path means a heat transfer path through which heat flows to be separated in a different direction from the heat transfer path through which heat flows along the plate. The branched portion may be disposed in a direction away from the vacuum space 50. The branched portion may be disposed in a direction toward the inside of the vacuum space 50. The branched portion may perform the same function as the extension portion described with reference to FIG. 9, and thus, a description of the same portion will be omitted. Referring to FIG. 10a, the second plate may include the branched portion 205. The branched portion may be provided in plurality, which are spaced apart from each other. The branched portion may include a third portion 203 of the second plate. Referring to FIG. 10b, the side plate may include the branched portion 153. The branched portion 153 may be branched from the second portion 152 of the side plate. The branched portion 153 may provide at least two. At least two branched portions 153 spaced apart from each other may be provided on the second portion 152 of the side plate. Referring to FIG. 10c, the first plate may include the branched portion 104. The branched portion may further extend from the second portion 102 of the first plate. The branched portion may extend toward the periphery. The branched portion 104 may be bent to further extend. A direction in which the branched portion extends in FIGS. 10a, 10b, and 10c may be the same as at least one of the extension directions of the extension portion described in FIG. 10.

FIG. 11 is a view for explaining a process of manufacturing the vacuum adiabatic body.

Optionally, the vacuum adiabatic body may be manufactured by a vacuum adiabatic body component preparation process in which the first plate and the second plate are prepared in advance. Optionally, the vacuum adiabatic body may be manufactured by a vacuum adiabatic body component assembly process in which the first plate and the second plate are assembled. Optionally, the vacuum adiabatic body may be manufactured by a vacuum adiabatic body vacuum exhaust process in which a gas in the space defined between the first plate and the second plate is discharged. Optionally, after the vacuum adiabatic body component preparation process is performed, the vacuum adiabatic body component assembly process or the vacuum adiabatic body exhaust process may be performed. Optionally, after the vacuum adiabatic body component assembly process is performed, the vacuum adiabatic body vacuum exhaust process may be performed. Optionally, the vacuum adiabatic body may be manufactured by the vacuum adiabatic body component sealing process (S3) in which the space between the first plate and the second plate is sealed. The vacuum adiabatic body component sealing process may be performed before the vacuum adiabatic body vacuum exhaust process (S4). The vacuum adiabatic body may be manufactured as an object with a specific purpose by an apparatus assembly process (S5) in which the vacuum adiabatic body is combined with the components constituting the apparatus. The apparatus assembly process may be performed after the vacuum adiabatic body vacuum exhaust process. Here, the components constituting the apparatus means components constituting the apparatus together with the vacuum adiabatic body.

The vacuum adiabatic body component preparation process (S1) is a process in which components constituting the vacuum adiabatic body are prepared or manufactured. Examples of the components constituting the vacuum adiabatic body may include various components such as a plate, a support, a heat transfer resistor, and a tube. The vacuum adiabatic body component assembly process (S2) is a process in which the prepared components are assembled. The vacuum adiabatic body component assembly process may include a process of disposing at least a portion of the support and the heat transfer resistor on at least a portion of the plate. For example, the vacuum adiabatic body component assembly process may include a process of disposing at least a portion of the support and the heat transfer resistor between the first plate and the second plate. Optionally, the vacuum adiabatic body component assembly process may include a process of disposing a penetration component on at least a portion of the plate. For example, the vacuum adiabatic body component assembly process may include a process of disposing the penetration component or a surface component between the first and second plates. After the penetration component may be disposed between the first plate and the second plate, the penetration component may be connected or sealed to the penetration component coupling portion.

An example of a vacuum adiabatic body vacuum exhaust process vacuum is as follows. The present disclosure may be any one of the, examples or a combination of two or more examples. The vacuum adiabatic body vacuum exhaust process may include at least one of a process of inputting the vacuum adiabatic body into an exhaust passage, a getter activation process, a process of checking vacuum leakage and a process of closing the exhaust port. The process of forming the coupling part may be performed in at least one of the vacuum adiabatic body component preparation process, the vacuum adiabatic body component assembly process, or the apparatus assembly process. Before the vacuum adiabatic body exhaust process is performed, a process of washing the components constituting the vacuum adiabatic body may be performed. Optionally, the washing process may include a process of applying ultrasonic waves to the components constituting the vacuum adiabatic body or a process of providing ethanol or a material containing ethanol to surfaces of the components constituting the vacuum adiabatic body. The ultrasonic wave may have an intensity between about 10 kHz and about 50 kHz. A content of ethanol in the material may be about 50% or more. For example, the content of ethanol in the material may range of about 50% to about 90%. As another example, the content of ethanol in the material may range of about 60% to about 80%. As another example, the content of ethanol in the material may be range of about 65% to about 75%. Optionally, after the washing process is performed, a process of drying the components constituting the vacuum adiabatic body may be performed. Optionally, after the washing process is performed, a process of heating the components constituting the vacuum adiabatic body may be performed.

The contents described in FIGS. 1 to 11 may be applied to all or selectively applied to the embodiments described with reference to the drawings below.

As an embodiment, an example of a process associated with a plate is as follows. Any one or two or more examples among following examples of the present disclosure will be described. The vacuum adiabatic body component preparation process may include a process of manufacturing the plate. Before the vacuum adiabatic body vacuum exhaust process is performed, the process of manufacturing the plate may be performed. Optionally, the plate may be manufactured by a metal sheet. For example, a thin and wide plate may be manufactured using plastic deformation. Optionally, the manufacturing process may include a process of molding the plate. The molding process may be applied to the molding of the side plate or may be applied to a process of integrally manufacturing at least a portion of at least one of the first plate and the second plate, and the side plate. For example, the molding may include drawing. The molding process may include a process in which the plate is partially seated on a support. The molding process may include a process of partially applying force to the plate. The molding process may include a process of seating a portion of the plate on the support a process of applying force to the other portion of the plate. The molding process may include a process of deforming the plate. The deforming process may include a process of forming at least one or more curved portions on the plate. The deforming process may include a process of changing a curvature radius of the plate or a process of changing a thickness of the plate. As a first example, the process of changing the thickness may include a process of allowing a portion of the plate to increase in thickness, and the portion may include a portion extending in a longitudinal direction of the internal space (a first straight portion). The portion may be provided in the vicinity of the portion at which the plate is seated on the support in the process of molding the plate. As a second example, the process of changing the thickness may include a process of reducing a thickness of a portion of the plate, and the portion may include a portion extending in a longitudinal direction of the internal space (a second straight portion). The portion may be provided in the vicinity of a portion to which force is applied to the plate in the process of molding the plate. As a third example, the process of changing the thickness may include a process of reducing a thickness of a portion of the plate, and the portion may include a portion extending in a height direction of the internal space (the second straight portion). The portion may be connected to the portion extending in the longitudinal direction of the internal space of the plate. As a fourth example, the process of changing the thickness may include a process of allowing a portion of the plate to increase in thickness, and the portion may include at least one of a portion to which the side plate extends in the longitudinal direction of the internal space and a curved portion provided between the portions extending in the height direction of the internal space (a first curved portion). The curved portion may be provided at the portion seated on the support of the plate or in the vicinity of the portion in the process of molding the plate. As a fifth example, the process of changing the thickness may include a process of allowing a portion of the plate to decrease in thickness, and the portion may include at least one of a portion to which the side plate extends in the longitudinal direction of the internal space and a curved portion provided between the portions extending in the height direction of the internal space (a second curved portion). The curved portion may be provided in the vicinity of a portion to which force is applied to the plate in the process of molding the plate. The deforming process may be any one of the above-described examples or an example in which at least two of the above-described examples are combined.

The process associated with the plate may selectively include a process of washing the plate. An example of a process sequence associated with the process of washing the plate is as follows. The present disclosure may be any one of the following examples or a combination of two or more examples. Before the vacuum adiabatic body vacuum exhaust process is performed, the process of washing the plate may be performed. After the process of manufacturing the plate is performed, at least one of the process of molding the plate and the process of washing the plate may be performed. After the process of molding the plate is performed, the process of washing the plate may be performed. Before the process of molding the plate is performed, the process of washing the plate may be performed. After the process of manufacturing the plate is performed, at least one of a process of providing a component coupling portion to a portion of the plate or the process of washing the plate may be performed. After the process of providing the component coupling portion to a portion of the plate is performed, the process of washing the plate may be performed.

The process associated with the plate selectively include the process of providing the component coupling portion to the plate. An example of a process sequence associated with the process of providing the component coupling portion to the plate is as follows. The present disclosure may be any one of the following examples or a combination of two or more examples. Before the vacuum adiabatic body vacuum exhaust process is performed, a process of providing the component coupling portion to a portion of the plate may be performed. For example, the process of providing the component coupling portion may include a process of manufacturing a tube provided to the component coupling portion. The tube may be connected to a portion of the plate. The tube may be disposed in an empty space provided in the plate or in an empty space provided between the plates. As another example, the process of providing the component coupling portion may include a process of providing a through-hole in a portion of the plate. For another example, the process of providing the component coupling portion may include a process of providing a curved portion to at least one of the plate or the tube.

The process associated with the plate may optionally include a process for sealing the vacuum adiabatic body component associated with the plate. An example of a process sequence associated with the process of sealing the vacuum adiabatic body component associated with the plate is as follows. The present disclosure may be any one of the following examples or a combination of two or more examples. After the process of providing the through-hole in the portion of the plate is performed, at least one of a process of providing a curved portion to at least a portion of the plate or the tube or a process of providing a seal between the plate and the tube may be performed. After the process of providing the curved portion to at least a portion of at least one of the plate or the tube is performed, the process of sealing the gap between the plate and the tube may be performed. The process of providing the through-hole in the portion of the plate and the process of providing the curved portion in at least a portion of the plate and the tube may be performed at the same time. The process of providing a through-hole in a part of the plate and the process of providing the seal between the plate and the tube may be performed at the same time. After the process of providing the curved portion to the tube is performed, the process of providing a through-hole in the portion of the plate may be performed. Before the vacuum adiabatic body vacuum exhaust process is performed, a portion of the tube may be provided and/or sealed to the plate, and after the vacuum adiabatic body vacuum exhaust process is performed, the other portion of the tube may be sealed.

When at least a portion of the plate is used to be integrated with a heat transfer resistor, the example of the process associated with the plate may also be applied to the example of the process of the heat transfer resistor.

Optionally, the vacuum adiabatic body may include a side plate connecting the first plate to the second plate. Examples of the side plate are as follows. The present disclosure may be any one of the following examples or a combination of two or more examples. The side plate may be provided to be integrated with at least one of the first or second plate. The side plate may be provided to be integrated with any one of the first and second plates. The side plate may be provided as any one of the first and second plates. The side plate may be provided as a portion of any one of the first and second plates. The side plate may be provided as a component separated from the other of the first and second plates. In this case, optionally, the side plate may be provided to be coupled or sealed to the other one of the first and second plates. The side plate may include a portion having a degree of strain resistance, which is greater than that of at least a portion of the other one of the first and second plates. The side plate may include a portion having a thickness greater than that of at least a portion of the other one of the first and second plates. The side plate may include a portion having a curvature radius less than that of at least a portion of the other one of the first and second plates.

In a similar example to this, optionally, the vacuum adiabatic body may include a heat transfer resistor provided to reduce a heat transfer amount between a first space provided in the vicinity of the first plate and a second space provided in the vicinity of the second plate. Examples of the heat transfer resistor are as follows. The present disclosure may be any one of the following examples or a combination of two or more examples. The heat transfer resistor may be provided to be integrated with at least one of the first or second plate. The heat transfer resistor may be provided to be integrated with any one of the first and second plates. The heat transfer resistor may be provided as any one of the first and second plates. The heat transfer resistor may be provided as a portion of any one of the first and second plates. The heat transfer resistor may be provided as a component separated from the other one of the first and second plates. In this case, optionally, the heat transfer resistor may be provided to be coupled or sealed to the other one of the first and second plates. The heat transfer resistor may include a portion having a degree of heat transfer resistance, which is greater than that of at least a portion of the other one of the first and second plates. The heat transfer resistor may include a portion having a thickness less than that of at least a portion of the other one of the first and second plates. The heat transfer resistor may include a portion having a curvature radius less than that of at least a portion of the other one of the first and second plates. The heat transfer resistor may include a portion having a curvature radius less than that of at least a portion of the other one of the first and second plates.

The contents described in FIGS. 1 to 11 may be applied to all or selectively applied to the embodiments described with reference to the drawings below.

The installation of the tube will be schematically described.

Figures 12, 13:
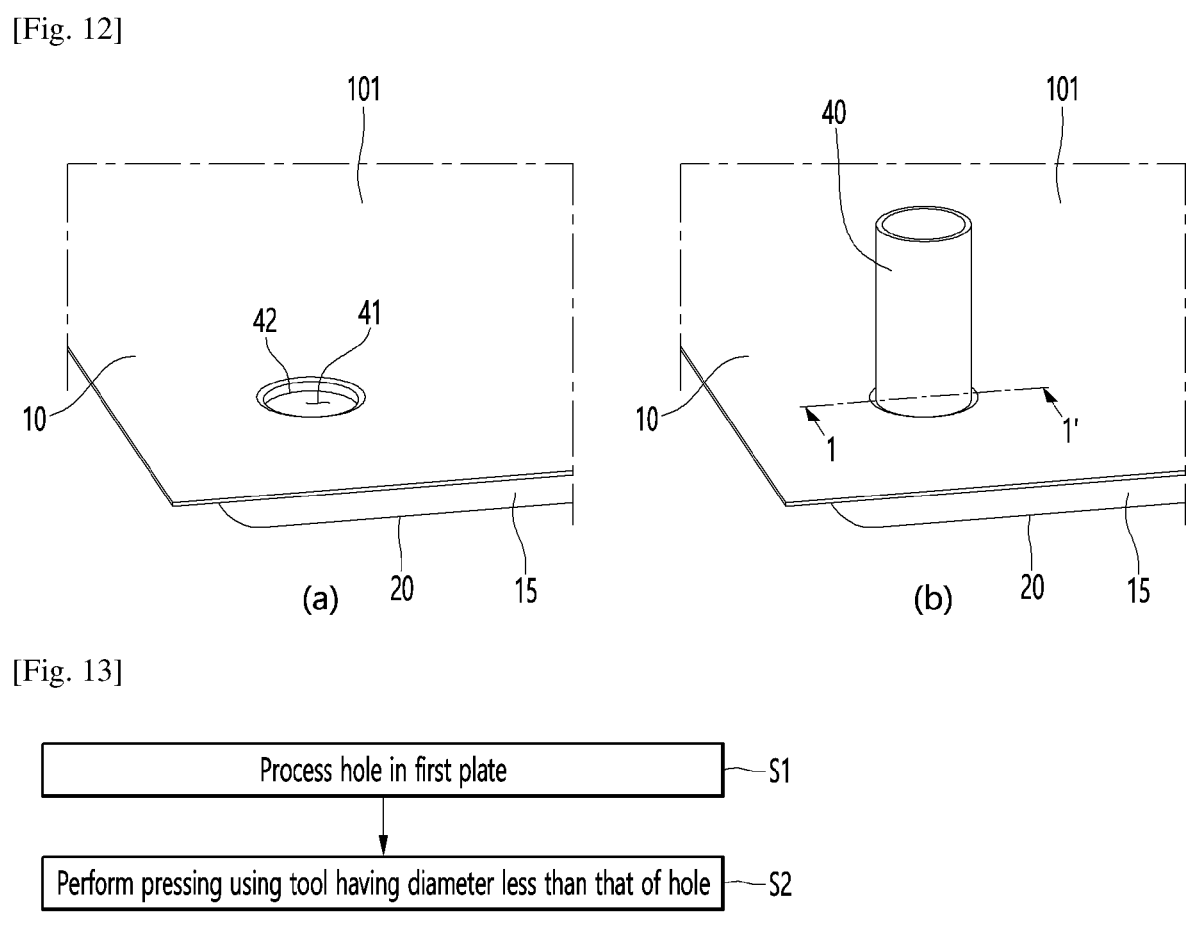

FIG. 12 is a perspective view in which a tube is installed in a vacuum adiabatic body. Here, (a) of FIG. 12 is a view illustrating a state before the tube is coupled, and (b) of FIG. 12 is a view illustrating a state after the tube is coupled.

Referring to FIG. 12, the vacuum adiabatic body according to one or more embodiments may have a tube 40. The tube 40 may be a tube for exhausting a fluid of the vacuum space 50. The tube 40 may be a tube for a getter, in which a getter for gas adsorption is supported. The tube 40 may serve as an exhaust port and a getter port.

Optionally, a thickness of the tube may be greater than that of the first plate 10. The thickness of the tube may be provided to be thicker than that of the second plate 20. The thickness of the tube may be provided to a thickness that is sufficient to withstand compression required for sealing the tube. The sealing may be performed through pinch-off. The tube may have a sufficient wall thickness. Since the tube is a soft material, it is necessary to increase in wall thickness. If the wall thickness is small, it may be torn at the time of sealing or may cause vacuum breakage. Examples of the aforementioned tube may be ports such as an exhaust port or a getter port.

Optionally, the tube may be provided as a circular or oval hollow tube made of a metal. The tube may be sealed after the exhaust or after inserting the getter. The tube may be sealed through pressure welding. The tube may be sealed by deforming the tube. The tube may be sealed through pinch-ing-off. The tube may be made of copper (CU) for easy deformation. Copper having strength less than that of stain-less steel may be used as the tube. Since the easily deform-able copper is used, the pinch-off process may be smoothly performed. In addition, it is possible to reliably provide the seal. Examples of the aforementioned tube may be ports such as an exhaust port or a getter port.

Optionally, the tube 40 may be inserted into the first plate 10. At least a portion of the tube 40 may be inserted into the vacuum space 50. At least a portion of the tube 40 may be in contact with the first plate 10. The tube 40 may be provided at the peripheral portion of the vacuum adiabatic body. A through-hole 41 for inserting the tube may be defined in the first plate 10. A flange 42 to which the tube 40 is coupled may be processed at the peripheral portion of the through-hole 41. The flange 42 may be provided to be integrated with the first plate 10. The flange 42 may be provided by a burr of the through-hole 41. The through-hole 41 may have the same shape as an outer shape of the tube 40. Examples of the aforementioned tube may be ports such as an exhaust port or a getter port.

Optionally, the flange 42 may have a predetermined height portion HL extending in a height direction of the vacuum space. The curvature portion may guide the tube 40. The curvature portion may allow the tube to be conveniently inserted into the through-hole 41. At least a portion of the height portion may provide a contact portion with the tube 40. At least a portion of the tube 40 may be in contact with and/or coupled to the height portion. The tube 40 may be guided to the flange 42. The tube may extend in the height direction of the vacuum space 50. Examples of the afore-mentioned tube may be ports such as an exhaust port or a getter port.

FIG. 13 is a view for explaining a method of processing the through-hole of the first plate.

Referring to FIG. 13, a hole may be processed in the first plate 10 (S1). Thereafter, the hole may be pressed using a pressing tool having a diameter greater than that of the hole (S2).

Optionally, a size of the hole may be less than the diameter of the through-hole 41. When the through-hole 41 has a circular shape, the hole may be provided in a circular shape. A diameter of a piercing tool for processing the hole may be less than an outer diameter of the tube 40 by 3 mm or less. A height of the flange 42 may be about 3 mm or less. The pressing tool and the hole may have the same geometric center, and a pressing process may be performed. The pressing tool may use the same diameter as the outer diameter of the tube 40. The pressing process may be a burring process. A burr may be provided in the burring process. In the pressing process, a peripheral portion of the hole may be stretched by a predetermined length to form the flange 42. The burr 402 may provide the flange 42. Examples of the aforementioned tube may be ports such as an exhaust port or a getter port.

Optionally, to smoothly form the flange 42 in the burring process, the following method may be applied. It may provide small force compared to the force applied in the general burring process. The force may be applied gradually for a longer time than that required for the general burring process. A first curvature may be processed in the periphery portion of the hole provided by the piercing process between the piercing process and the burring process. During the burring process, a support having a groove corresponding to a desired shape of the burr may be provided on a surface on which the burr is generated. It may provide the flange 42 having a small curvature radius R through the above process. A portion at which the curvature radius is formed may be referred to as a curvature portion. Examples of the afore-mentioned tube may be ports such as an exhaust port or a getter port.

FIG. 14 is a cross-sectional view taken along line 1-1' of FIG. 12b. For reference, FIG. 14 illustrates a state in which the vacuum adiabatic body is applied to a door. A cross-section of the tube and its related configuration will be described with reference to FIG. 14.

In one or more embodiments, the first plate 10 may have a thickness of at least about 0.1 mm or more. Thus, it may secure rigidity to obtain process stability when inserting the tube 40. The thickness of the first plate 10 may be about 0.1 mm. The second plate 20 may have a thickness of about 0.5 mm or more. The thin first plate 10 may be provided because conductive heat decreases. If the first plate 10 is thin, there may be a disadvantage that it is vulnerable to deformation. When the tube 40 is inserted into the through-hole 41, the first plate 10 in the vicinity of the through-hole 41 may be deformed. In this case, there may be a high possibility that the first plate 10 is in contact with the heat transfer resistor 32 to cause a heat loss. Here, an example of the heat transfer resistor described with reference to FIG. 14 may be a radiation resistance sheet. Examples of the aforementioned tube may be ports such as an exhaust port or a getter port.

A height H1 of the flange 42 may be provided to be about 1 mm or more and about 3 mm or less. When the height of the flange 42 exceeds about 3 mm, there is a high risk that the heat transfer resistor 32 and the flange 42 are in contact with each other. If the height of the flange 42 exceeds about 3 mm, the first plate 10 may be torn during the pressing process, and thus, there may be a high possibility that the flange is torn. If there is a processing error of the flange, these limitations may be more serious. If the height of the flange is less than about 1 mm, a contact surface may decrease when brazing the tube and the flange, and thus, there may be a high risk of vacuum leakage. If the height of the flange is less than about 1 mm, coupling strength between the tube and the flange may be weakened, and thus, there may be a high possibility that the coupling part is damaged. A filler metal may be injected into the contact surface. Examples of the aforementioned tube may be ports such as an exhaust port or a getter port.

Optionally, the curvature radius R of the curvature portion of the flange 42 defining the through-hole 41 may be less than that of each of all bent portions provided on the first plate 10. The curvature radius R of the flange 42 defining the through-hole 41 may be less than that of each of all bent portions provided on the second plate 20. The curvature radius R of the flange 42 defining the through-hole 41 may be less than that of each of all bent portions provided on the side plate 15. A length of the height portion HL of the flange 42 may increase by reducing the curvature radius of the flange 42. The height portion HL of the flange 42 may be a portion at which the tube 40 and the flange 42 are bonded to each other through brazing. A large contact area between the tube 40 and the flange 42 may be secured by allowing the length of the height portion HL of the flange 42 to increase. Examples of the aforementioned tube may be ports such as an exhaust port or a getter port.

Optionally, the tube may be insulated with the additional adiabatic body 90. The additional adiabatic body 90 may insulate a gap between the tube 40 and the first space and/or a gap between the tube 40 and the second space. The tube 40 may not have access to the plate containing the additional adiabatic body 90. The tube 40 may have high thermal insulation performance as being spaced apart from the plate. This is because the tube 40 is made of copper having high thermal conductivity. Examples of the aforementioned tube may be ports such as an exhaust port or a getter port.

The deformation of the seal of the tube 40 may be propagated along the tube 40 to a bonding portion of the tube 40 and the flange 42. In this case, the bonding portion may be damaged. The bonding portion may have the first plate 10 having low rigidity as one bonding surface. For this reason, there may be a greater risk of damage to the bonding portion. It may reduce the insulation loss through the tube 40 by providing the optimal length of the tube 40. It may prevent the bonding portion from being damaged by providing the optimal length of the tube 40. Examples of the aforementioned tube may be ports such as an exhaust port or a getter port.

Optionally, a height H2 of the tube 40 protruding from the first plate 10 may be at least twice the diameter of the tube 40. In this case, the deformation of the seal of the tube 40 may not be transmitted to the bonding portion. In this case, even when the seal is formed, the tube 40 may be maintained in its original shape at the bonding portion. It may be the case that the tube 40 does not have a circular shape. In this case, the height of the tube may mean more than twice a mean diameter of the tube 40. Here, the mean diameter may mean a mean distance from the geometric center of the cross-section of the tube to an edge of the cross-section of the tube. The tube 40 may extend obliquely in the height direction of the vacuum space 50. In this case, the distance from the seal of the tube to the point closest to the first plate 10 may be twice the diameter of the tube 40 or more. Examples of the aforementioned tube may be ports such as an exhaust port or a getter port.

Optionally, it may have an end of the tube 40 protruding from the first plate 10. The end may not be in contact with an outer surface or boundary of the additional adiabatic body 90. The tube 40 may extend in the height direction in the vacuum state. In this case, the tube 40 and the gasket 80 may be vertically aligned. A heat conduction path between the end of the tube 40 and an adjacent portion of the gasket 80 may be generated to increase the insulation loss. A distance H3 from the end of the tube 40 to the outer surface or boundary of the additional adiabatic body 90 may be about 20 mm or less. The height H2 of the tube 40 protruding from the first plate 10 may be greater than a distance H3 from the end of the tube 40 to the boundary of the additional adiabatic body 90. Examples of the aforementioned tube may be ports such as an exhaust port or a getter port.

Optionally, the sum of the height H2 of the tube 40 protruding from the first plate 10 and the distance H3 from the end of the tube 40 to the boundary of the additional adiabatic body 90 may be provided to be greater than the height of the vacuum space 50. The vacuum space 50 may be provided to be about 10 mm or more and about 20 mm or less. Examples of the aforementioned tube may be ports such as an exhaust port or a getter port.

Optionally, the flange 42 may face the vacuum space 50. Thus, the flange 42 may guide the insertion of the tube 40. In addition, the operator may conveniently insert the tube 40. In another embodiment, the flange 42 may be directed to the outside of the vacuum space 50. Examples of the aforementioned tube may be ports such as an exhaust port or a getter port.

FIG. 15 illustrates an embodiment in which the flange extends toward the outside of the vacuum space. In one or more other embodiments, the flange 42 may extend to the outside of the vacuum space 50. The flange 42 may extend toward the first space.

Optionally, the end of the flange 42 may not be in contact with the heat transfer resistor 32. The heat transfer resistor may be freely installed inside the vacuum space 50 without interference of the flange 42. The heat transfer resistor 32 may be installed adjacent to or in contact with the first plate 10. The support 30 may be installed without the interference of the flange 42. The interference, contact, and adjacency between the respective heat transfer resistors 32, 33, 60, and 63 placed in the vacuum space 50 and the flange 42 may be prevented from occurring. Thus, a degree of freedom in design may increase, and the heat conduction may decrease. Here, the interference may mean that the product design is difficult because the regions of the components overlap each other during the design. The contact may mean that the components are in contact with each other, and the insulation loss increases rapidly. The adjacency may refer to the intervening of an additional insulating material due to the occurrence of thermal insulation loss due to adjacent components.

Examples of the aforementioned tube may be ports such as an exhaust port or a getter port.

The first plate 10 may be made of stainless steel to have sufficient strength. The first plate 10 may be provided as a thin plate to obtain low thermal conductivity. The tube 40 may be made of ductile copper to enable pinch-off (sealing together with cutting). The tube 40 and the first plate 10 should be sealed to prevent vacuum leakage. Since the tube 40 and the first plate 10 are different metals, a bonding method of heterometals may be applied. As a sealing method for bonding the heterometals, sealing in which heterometals are coupled with a filler metal may be applied. Examples of the aforementioned tube may be ports such as an exhaust port or a getter port.

A method of bonding the heterometals with the filler metal includes welding, brazing, and soldering. The soldering is a method of bonding using a filler metal having a relatively low melting point. Since the soldering is weak in strength, it is difficult to apply to the bonding of the tube 40 and the first plate 10. The welding and brazing are methods of bonding using a filler metal having a relatively high melting point. Among them, the welding is a method of bonding a base material at a temperature above the melting point of the base material to be coupled, and the brazing is a method of bonding two base materials by applying heat using the filler metal without damaging the base material at the temperature below the melting point of the base material. The welding is difficult to apply because the first plate 10 is a thin plate and is a metal different from the tube. Examples of the aforementioned tube may be ports such as an exhaust port or a getter port.

The brazing may be used for bonding the tube 40 to the first plate 10. More precisely, the brazing may apply heat above a liquidus temperature of the filler metal. The brazing may refer to a method of bonding two base materials by applying heat to be controlled below a solidus temperature of the base material. The base material is copper and stainless steel. Examples of the aforementioned tube may be ports such as an exhaust port or a getter port.

The brazing includes various methods such as torch brazing, high-frequency brazing, furnace brazing, silver brazing, and dip brazing. In the high-frequency brazing, the filler metal is placed on a contact surface of the heterometals to be coupled, and the filler metal is heated at a high frequency to be melted and bonded. In the high-frequency brazing, there is no direct contact between a heating source and the filler metal, and thus, high-quality bonding is possible. When the filler metal is heated, the melted filler metal at the bonding portion may be permeated finely between the bonding portions due to a capillary effect. After the filler metal is solidified, strong metallurgical bond may be formed by the filler metal on a bonding surface. The filler metal may further include a flux for improving wettability of the filler metal and removing an oxide film.

The bonding portion by the brazing, first, may obtain stronger tensile strength than the two coupled metals, secondly, the coupled portion has strong resistance to a liquid or gas, and thirdly, it is also strong in vibration or impact, and fourth, there is an advantage that there is no deformation with respect to the temperature change. In the brazing, since the two coupled metals are not coupled by themselves, there is no twist or distortion, and the properties of the metal itself of the base material may be maintained.

(a) of FIG. 16 is a view for explaining an operation of the high-frequency brazing. Referring to (a) of FIG. 16, a heating tube 423 is disposed in the vicinity of the bonding surface. The heating tube 423 may be a high-frequency coil. Current may flow through the heating tube 423. The contact surface of the flange 42 and the tube 40 may be high-frequency brazed.

The high-frequency brazing may have the following characteristics. First, selective heating is possible. The high-frequency brazing may not affect other portions at all within the allowable working limit. The high-frequency brazing may intensively heat only the desired bonding portion by the principle of high-frequency induction. Since the heat source is not in direct contact with the bonding portion during heating, there is no damage to the bonding portion. Because there is no phenomenon that the bonding portion is repeatedly exposed to heat (thermal stress, torsion), the lifespan of the bonding portion is long. The high-frequency brazing may control the flowability of the filler metal 403 to cleanly and uniformly control the bonding surface. The high-frequency brazing may reduce impurities due to oxidation compared to other methods using flame. The high-frequency brazing may reduce the repeated process time because the heating cycle is short. The high-frequency brazing does not affect the surrounding environment even when heated for a long time.

As illustrated in FIG. 17, the contact surface between the flange 42 and the tube 40 is narrow. For the narrow contact surface, a filler metal having excellent penetrability is preferable. Since the flange 42 uses a burr having an arbitrary shape for each product, the contact surface between the flange 42 and the tube 40 may not be uniform. A filler metal that is optimal for the contact surface between the flange 42 and the tube 40 may be selected by reflecting this characteristic. Examples of the aforementioned tube may be ports such as an exhaust port or a getter port.

Many materials may be used for the filler metal, but a phosphor-copper alloy including phosphorus (In) and copper (Cu) may be used. The copper may be a base material, and other materials may act as additives.

The filler metal may include copper, which is a material of at least one member to be brazed. For example, when the tube 40 is made of copper, the filler metal may include copper. When the filler metal includes the same material as at least one of the brazed members, the filler metal and the member may be mixed to increase the bonding force. When the bonding force increases, a mechanical shock during the pinch-off may be well tolerated. For example, copper of the tube 40 and copper of the filler metal may be mixed well with each other to increase in bonding strength. Examples of the aforementioned tube may be ports such as an exhaust port or a getter port.

The tube 40 may use copper as a flexible material required for the pinch-off. If the copper constituting the tube 40 is brazed at an excessively high temperature, a large amount of copper oxide may be formed. Since the copper oxide has a high hardness, it may be difficult to pinch-off. In order to improve this limitation, the filler metal may contain phosphorus having a low melting point to lower the brazing temperature. Examples of the aforementioned tube may be ports such as an exhaust port or a getter port.

In the brazing process, high-temperature heat is generated. The heat may be propagated to the peripheral portion to cause oxidation or deformation of the support 30. In order to prevent this limitation, it is desirable to lower the temperature of the brazing process. The phosphor-copper filler metal 403 capable of lowering the temperature of the brazing process, that is, the melting temperature of the filler metal, may be preferable.

The widely used filler metal 403 requires a high-temperature atmosphere of about 700 degrees to about 1,000 degrees. Here, due to the heat conducted through the tube and the first plate 10, the adjacent support 30 may be oxidized over a temperature of about 200 degrees. Here, the temperature of about 200 degrees may be a heat resistance temperature of a PPS material.

FIG. 16 is a view illustrating a portion at which a brazing process is performed, wherein (a) of FIG. 16 illustrates a case in which a phosphorus content is appropriate, (b) of FIG. 16 illustrates a case in which the phosphorus content is insufficient, and (c) of FIG. 16 illustrates a case in which the phosphorus content is excessive. An action and content of phosphorus will be described with reference to FIG. 16.

The phosphorus may be contained in the filler metal to minimize the temperature rise of the adjacent support 30 and its surrounding area during the brazing process. Thus, it is possible to prevent thermal deformation of the support 30 (see (a) of FIG. 16). It is not preferable that a phosphorus content in the copper filler metal 403 is excessively large. For example, when the temperature of the brazing process reaches a boiling point of phosphorus (boiling point of phosphorus: about 280 degrees), an explosion phenomenon may occur. When the boiling point of phosphorus is exceeded, the melting pool becomes very unstable, pores and the like occur to make it difficult to perform the brazing process (see (c) of FIG. 16). If the content of phosphorus is too small, the temperature of the adjacent support 30 and its surrounding area may increase during the brazing process. Accordingly, thermal deformation of the support 30 may occur. Accordingly, the support may be oxidized (see (b) FIG. 16). A phosphorus content of about 5% to about 15% is appropriate.

Since the phosphorus itself acts as a flux, a separate flux input is not required during the brazing process. Accordingly, it is possible to prevent the occurrence of outgassing due to the non-metal flux remaining in the vacuum space 50 after the brazing process. Here, the brazing flux is required to prevent oxidation of the filler metal and base material, thereby obtaining a good quality bonding surface. A metal may undergo oxidation when exposed to air. The oxidation reaction may be severe as the temperature increases. In the brazing process, the oxidation reaction may occur because the temperature is raised for bonding of the two metals, and the metal is in contact with air. A flux is needed to prevent the oxidation reaction. The flux may directly decompose, remove, or inhibit the formation of oxides or other unnecessary substances.

The filler metal 403 may further include silver. The silver has excellent corrosion resistance, electrical conductivity, thermal conductivity, and the like. Silver by itself has low strength, but when combined with other elements to form a silver alloy, the silver alloy may have strong strength. The silver may lower a melting point and improve wettability, processability, and the like.

In order to maintain the vacuum adiabatic body in a high vacuum for a long time exceeding about 10 years, it is preferable that there is no minute leakage on the bonding surface. In order for the liquid filler metal to be penetrated into the entire fine contact surface between the tube 40 and the flange 42, the liquid filler metal 403 has to have good permeability, flowability, and wettability. Since the silver has good permeability, flowability, and wettability, a higher silver content is preferable. The filler metal 403 may contain about 5% or more of silver. Examples of the aforementioned tube may be an exhaust port, a getter port, or the like.

If the liquid filler material 403 has excessively high permeability and flowability, the liquid filler material 403 may flow down through the contact surface between the tube 40 and the flange 42. If the permeability and flowability of the liquid filler metal 403 are too large, various limitations may occur. For example, when the high-temperature liquid filler metal 403 reaches the support 30, the support 30 may be melted or oxidized. When the support 30 is melted, the support 30 is deformed, and thus, a function of the support 30 may not be performed. When the support 30 is oxidized, the filler metal and the support 30 may form various oxides. The oxide may cause outgassing. If the liquid filler material 403 has excessively high permeability and flowability, it may flow into a heat transfer resistor 32. The filler metal 403 may be solidified with the heat transfer resistor 32 attached thereto. In this case, the solidified filler metal 403 may form a heat bridge between the heat transfer resistor 32 and the tube 40. An adiabatic loss of the vacuum adiabatic body may increase by the heat bridge. The solidified filler metal 403 may act as a load on the thin heat transfer resistor 32 to cause damage of the heat transfer resistor 32 and deterioration of a radiation shielding function. Examples of the aforementioned tube may be ports such as an exhaust port or a getter port.

Since the silver has great permeability, flowability, and wettability, it is preferable that the silver content is lower. The filler metal 403 may contain about 15% or less of silver. The silver may include about 5% or more and about 15% or less of the total filler metal 403.

The content of phosphorus, copper, and silver may have the following relationship. A weight ratio of the filler metal 403 may be greater for copper than for silver. The weight ratio of the filler metal 403 may be greater than that of silver and phosphorus. The weight ratio of the filler metal 403 may be greater for copper than silver and greater for silver than phosphorus. Through this combination, the filler metal 403 may have permeability of about 50% to about 90% compared to the permeability when only silver (Ag) is used.

The filler metal 403 may include a material having the same or similar coefficient of thermal expansion as at least one of the brazed members. In the filler metal 403, when the thermal expansion coefficients of the brazed members are the same or similar to each other, stress according to the thermal deformation applied to the bonding portion may be insignificant or absent. For example, when the tube 40 and the flange 42 is expanded and contracted according to a change in temperature, the bonding portion may be expanded and contracted in the same or similar manner. In this case, the stress applied to the bonding portion may be reduced. Since the vacuum adiabatic body is used for a long period of more than 10 years, the thermal deformation may act repeatedly. Since the low-temperature pinch-off is performed after the high-temperature brazing is finished, the temperature change is large. The stress according to the thermal deformation may act largely on the bonding portion. In order to improve this limitation, the material of the filler metal 403 may include copper, which is the same member as the tube 40. Examples of the aforementioned tube may be ports such as an exhaust port or a getter port.

The arrangement of the filler metal 403 will be described.

The filler metal 403 may be provided in a donut shape surrounding the tube 40. The filler metal 403 surrounds an outer peripheral portion of the tube 40 so that the filler metal 403 is evenly penetrated into a gap between the tube 40 and the flange 42. In this case, the flange 42 may have a height of about 1 mm, the first plate 10 may have a height of about 0.1 mm, and the tube 40 may have a height of about 0.5 mm. Examples of the aforementioned tube may be ports such as an exhaust port or a getter port.

FIG. 17 is a view illustrating an installation method of the filler metal when a flange extends to the outside of the vacuum space.

Referring to (a) of FIG. 17, the filler metal 403 may be placed on a protrusion of an end of the flange 42. The protrusion may be a height difference portion between the flange 42 and the tube 40. In this case, the filler metal 403 in the melted state may be penetrated well through a contact interval between the flange 42 and the tube 40. Examples of the aforementioned tube may be ports such as an exhaust port or a getter port.

Referring to (b) of FIG. 17, the filler metal may be disposed on an outer surface of the flange 42. The flange 42 may be provided by burring the first plate 10. The burring processing is not to process the designed shape, but to intentionally create the burr, which is a surplus plate material generated during the hole processing. The burr 402 may not have a strictly defined shape and may have any of various modified shapes. In order to collectively correspond to various shapes of the flange 42, the filler metal 403 may be disposed on the outer surface of the flange 42.

The filler metal 403 may be provided to be slightly larger than in the general case. The filler metal 403 in the melted state may ride over an upper end of the flange 42. The filler metal 403 may be provided in an amount sufficient to be injected into the contact portion between an inner surface of the flange 42 and an outer surface of the tube 40 in the melted state. The filler metal 403 may be injected into the outer surface of the flange 42, on which the filter metal 403 will be disposed. The filler metal 403 may be injected into the contact portion between the flange 42 and the tube 40. Examples of the aforementioned tube may be ports such as an exhaust port or a getter port.

Referring to (c) of FIG. 17, the filler metal 403 may be disposed on the contact portion between the inner surface of the flange 42 and the outer surface of the tube 40 in a solid state. An inner diameter of the flange 42 may be provided to be larger than the outer diameter of the tube 40 in the burring process by a certain amount. As the solid filler metal 403 is positioned, the melted filler metal 403 may be accurately injected into the contact interval between the inner surface of the flange 42 and the outer surface of the tube 40.

FIG. 18 is a view illustrating an installation method of the filler metal 403 when the flange extends into the vacuum space.

Referring to FIG. 18, the filler metal 403 may be disposed on a curved portion of the flange 42. Since the flange 42 is provided by the burr, the flange may be disposed on a predetermined curvature portion corresponding to a root portion of the burr. The filler metal 403 may be moved after melting. The filler metal 403 may be inserted into the contact interval between the inner surface of the flange 42 and the outer surface of the tube 40. The contact interval may be a portion extending downward from the curved portion. According to this embodiment, the filler metal 403 may be accurately injected into the contact interval between the flange 42 and the tube 40 without invading other portions in the melted state. Examples of the aforementioned tube may be ports such as an exhaust port or a getter port.

FIG. 19 is a view for explaining an operation of a high-frequency brazing according to another embodiment. Referring to FIG. 19, a heating tube 423 is disposed in the vicinity of the bonding surface. The heating tube 423 may be a high-frequency coil. Current may flow through the heating tube 423. The contact surface of the flange 42 and the tube 40 may be high-frequency brazed.

FIG. 20 is a view illustrating a distance between the flange and the tube of FIG. 19. As illustrated in FIG. 20, the contact surface between the flange 42 and the tube 40 is narrow. For the narrow contact surface, a filler metal 403 having excellent penetrability is preferable. Since the flange 42 uses a burr having an arbitrary shape for each product, the contact surface between the flange 42 and the tube 40 may not be uniform. A filler metal that is optimal for the contact surface between the flange 42 and the tube 40 may be selected by reflecting this characteristic. Examples of the aforementioned tube may be ports such as an exhaust port or a getter port.

According to another embodiment, alloy including at least one of silver, copper, and zinc may be used for the filler metal. The silver has excellent corrosion resistance, electrical conductivity, thermal conductivity, and the like. Silver by itself has low strength, but when combined with other elements to form a silver alloy, the silver alloy may have strong strength. Since the silver alloy has strong penetrating power when melted, a strong bonding surface may be obtained. Silver may lower the melting point of the filler metal and improve wettability, workability, and the like. The copper has many advantages, such as ductility, thermal conductivity, conductivity, corrosion resistance, and strong penetration, and is relatively cheaper than silver. The zinc may be useful because of its low melting point and may be improved in wettability. When zinc is added in a large amount, brittleness increases, and zinc has a low vaporization point, which is not preferable. Under the above background, in this embodiment, a silver alloy containing at least silver may be used as the filler material. Hereinafter, a weight ratio of each material including silver among the filler metal will be described in detail.

In an embodiment, the filler metal may include silver (Ag) and copper (Cu). The melting point of silver is about 961 degrees, and the melting point of copper is about 1,084 degrees. As a composition ratio of the filler metal, silver may be greater than copper.

The filler metal 403 may further include zinc (Zn). The melting point of zinc is about 419 degrees. When zinc is further contained in the filler metal, it is possible to lower the melting point of the filter metal. Accordingly, it is possible to further lower a process temperature during the brazing.

When the brazing process temperature is lowered, a relatively low temperature atmosphere may be created. It is possible to reduce damage to components due to the high-temperature heat suffered by the support 30 made of a resin. The tube 40 may use copper as a flexible material required for the pinch-off. If the copper constituting the tube 40 is brazed at an excessively high temperature, copper oxide may be formed. Since the copper oxide has a high hardness, it may be difficult to pinch-off. In order to improve this problem, the filler metal may contain zinc to lower the brazing temperature. Examples of the aforementioned tube may be ports such as an exhaust port or a getter port.

In the background mentioned above, there is more silver than copper in the filler metal. The filler metal contains more copper than zinc. The filler metal may contain the largest amount of silver, followed by copper, and finally, the smallest amount of zinc.

In order to maintain the vacuum adiabatic body in a high vacuum for a long time exceeding about 10 years, it is preferable that there is no minute leakage on the bonding surface. In order for the liquid filler metal to be penetrated into the entire fine contact surface between the tube 40 and the flange 42, the liquid filler metal has to have good permeability, flowability, and wettability. Since the silver has good permeability, flowability, and wettability, a higher silver content is preferable. The filler metal may contain about 50% or more of silver. Examples of the aforementioned tube may be ports such as an exhaust port or a getter port.

If the liquid filler material has excessively high permeability and flowability, the liquid filler material may flow down through the contact surface between the tube 40 and the flange 42. If the permeability and flowability of the liquid filler metal are too large, various limitations may occur. Examples of the aforementioned tube may be ports such as an exhaust port or a getter port.

In an embodiment, the vacuum adiabatic body may include a seal that seals a gap between the first plate 10 and the second plate 20 to provide a first plate 10 having a first temperature, a second plate 20 having a second temperature different from the first temperature, and a vacuum space 50. Optionally, the vacuum adiabatic body may be manufactured through a vacuum adiabatic body component preparation process of preparing the first plate and the second plate in advance, a vacuum adiabatic body component assembly process of assembling the prepared first and second plates with each other, and a vacuum adiabatic body vacuum exhaust process of discharging a gas within a space defined between the first plate and the second plate after the component assembly process. Optionally, before the vacuum adiabatic body vacuum exhaust process, the vacuum adiabatic body may be manufactured in a vacuum adiabatic boy component sealing process, in which the space between the first plate and the second plate is sealed. Optionally, the vacuum adiabatic body component sealing process may include a process of providing the filler metal to the seal. For example, the seal may be a welded portion. The seal may be performed at a portion sealed by high-frequency brazing. Optionally, after the vacuum adiabatic body vacuum exhaust process, a device assembly process in which the vacuum adiabatic body and components constituting the device may be coupled to each other may be performed.

Optionally, the vacuum adiabatic body may be manufactured by the vacuum adiabatic body component sealing process. An example of the vacuum adiabatic body component sealing process is as follows. The vacuum adiabatic body component sealing process may include a process of performing sealing in a state in which the filler metal is provided to the seal. The vacuum adiabatic body component sealing process may include a process of applying heat in the state in which the filler metal is provided to the seal.

Optionally, at least a portion of the vacuum adiabatic body may be sealed by the filler metal 403. The filler metal may include a first material. Examples related to the first portion are as follows. The present disclosure may be any one of the following examples or a combination of two or more examples. The first material may include silver. The mass of the first material contained in the filler metal may be about 50% or more of the total mass of the filler metal. In order to maintain the vacuum space for a long time, the seal should be designed to reduce leakage. For this, the filler metal provided in the seal has to have improved permeability. In this embodiment, permeability of a material may be defined as the extent to which the material flows when the material reaches its melting point. Accordingly, it may be advantageous that the filler metal has a higher mass of the first material having higher permeability than the mass of other materials contained in the filler metal. The mass of the first material contained in the filler metal may be about 75% or less of the total mass of the filler metal. The reason is that, if the flowability of the filler metal is excessive, the filler metal may be attached to the vacuum adiabatic body component and damaged while the vacuum adiabatic body component sealing process is performed. The filler metal may have a material having permeability of about 50% to about 90% of permeability when the first material reaches the melting point.

Optionally, the filler metal may include a second material. Examples of the second material are as follows. The present disclosure may be any one of the following examples or a combination of two or more examples. A melting point of the second material may be higher than that of the first material. The second material may include at least a portion of the materials contained in the seal. For example, the second material may include at least a portion of materials contained in the plate and the sealing component. As another example, the second material may include a material different from that of the plate. As another example, the second material may include Cu. In this case, it is possible to improve sealing force during the fusion welding for the sealing. In addition, it is possible to improve the sealing force even during the pressure welding for the sealing. A mass of the first material may be greater than a mass of the second material. The permeability of the first material may be higher than that of the second material.

Optionally, the filler metal may include a third material. Examples of the third material are as follows. The present disclosure may be any one of the following examples or a combination of two or more examples. The third material may include a material having a melting point lower than that of the first material and the second material. In this case, since the melting point of the filler metal is lowered, a heating temperature may be lowered during the fusion for the sealing, thereby reducing damage to components provided around the seal. In addition, it is possible to reduce the increase in hardness of the seal due to oxidation during the fusion welding. The third material may include zinc. A mass of the second material contained in the filler metal may be greater than a mass of the third material contained in the filler metal.

Optionally, the filler metal may include at least a portion of the material of the seal. Examples related to the material of the filler metal are as follows. The present disclosure may be any one of the following examples or a combination of two or more examples. The filler metal may include at least a portion of a material of the component to be sealed with the plate. The component to be sealed with the plate may include a tube. The filler metal may include a material different from that of the plate. In this case, it is possible to improve sealing force during the fusion welding for the sealing. In addition, it is possible to improve the sealing force even during the pressure welding for the sealing. The filler metal may include a material having a melting point lower than that of at least some of the materials of the seal. In this case, since the melting point of the filler metal is lowered, a heating temperature may be lowered during the fusion for the sealing, thereby reducing damage to components provided around the seal. In addition, it is possible to reduce the increase in hardness of the seal due to oxidation during the fusion welding. The filler metal may include a material having permeability higher than that of at least some of the materials of the seal. The reason is that in order to design the seal to reduce leakage, the filler metal provided in the seal has to have improved permeability. The filler metal may include at least a portion of copper.

FIG. 21 is a view comparing a case (a) in which the permeability and flowability of the liquid filler metal are appropriate, and a case (b) in which the permeability and flowability of the liquid filler metal are excessively high.

Referring to FIG. 21, a support 30 is disposed adjacent to a contact surface of the tube 40 and the flange 42. The support 30 is made of a resin material. The support 30 has a lower melting point and a lower vaporization point than other members made of metals. When the high-temperature liquid filler metal 403 is in contact with the support 30, the support 30 may be melted or oxidized. When the support 30 is melted, or the support 30 is deformed, a function of the support 30 may not be performed. When the support 30 is oxidized, the filler metal 403 and the resin may form various oxides. The oxide may cause outgassing. The outgassing of the oxide may adversely affect a degree of vacuum of the vacuum space 50. Examples of the aforementioned tube may be ports such as an exhaust port or a getter port.

If the liquid filler material 403 has excessive permeability and flowability, it may flow into the heat transfer resistor 32. The filler metal 403 and the heat transfer resistor 32 may be solidified while being attached to each other. In this case, the solidified filler metal 403 may form a heat bridge between the heat transfer resistor 32 and the tube 40. An adiabatic loss of the vacuum adiabatic body may increase by the heat bridge. The solidified filler metal 403 may act as a load on the thin heat transfer resistor 32 to cause damage of the heat transfer resistor 32 and deterioration of a radiation shielding function. Examples of the aforementioned tube may be ports such as an exhaust port or a getter port.

Since the silver has great permeability, flowability, and wettability, it is preferable that the silver content is lower. The filler metal may contain about 75% or less of silver. As the filler metal 403, a material having permeability of about 50% to about 90% may be used as compared to the permeability when only silver (Ag) is used. Here, % may refer to a weight ratio. Here, the material may include an alloy.

In consideration of the factors as described above, the filler metal 403 may contain about 50% or more and about 75% or less of the silver.

The filler metal 403 may include a material of at least one member to be brazed. For example, when the tube 40 is made of copper, the filler metal may include copper. When the filler metal includes the same material as at least one of the brazed members, the filler metal and the member may be mixed to increase the bonding force. When the bonding force increases, the bonding portion may well withstand the mechanical impact during the pinch-off. For example, copper of the tube 40 and copper of the filler metal may be mixed well with each other to increase in bonding strength. Examples of the aforementioned tube may be ports such as an exhaust port or a getter port.

The filler metal 403 may include a material having the same or similar coefficient of thermal expansion as at least one of the brazed members. When the thermal expansion coefficient of the filler metal and the thermal expansion coefficient of the brazed member are the same or similar to each other, stress according to the thermal deformation applied to the bonding portion may be insignificant or absent. For example, when the tube 40 and the flange 42 is expanded and contracted according to a change in temperature, the bonding portion may be expanded and contracted in the same or similar manner. In this case, the stress applied to the bonding portion may be reduced. Since the vacuum adiabatic body is used for a long period of more than 10 years, the thermal deformation may act repeatedly. Since the low temperature pinch-off is performed after the high temperature brazing is finished, the temperature change is large. The stress due to the thermal deformation may act greatly on the bonding portion. In order to improve this limitation, the material of the filler metal may include copper, which is the same member as the tube 40. Examples of the aforementioned tube may be ports such as an exhaust port or a getter port.

INDUSTRIAL APPLICABILITY

According to the embodiment, the vacuum adiabatic body that is capable of being applied to real life may be provided.

The invention claimed is:

1. A vacuum adiabatic body, comprising:
a first plate having a through-hole;
a second plate spaced apart from the first plate to form-a an empty vacuum space between the first plate and the second plate;
a tube that extends into the through-hole of the first plate and partially into the vacuum space; and
a filler metal disposed at a bonding surface between the tube and the first plate, wherein the filler metal comprises a first material, wherein the first material comprises silver (Ag), and wherein a mass of the first material is below 75% of a total mass of the filler metal.

2. The vacuum adiabatic body according to claim 1, wherein the first material comprises a material wherein having a permeability higher than each of other materials contained in the filler metal.

3. The vacuum adiabatic body according to claim 1, wherein a mass of the first material is within a range of 50% to 75% of a total mass of the filler metal.

4. The vacuum adiabatic body according to claim 1, wherein a permeability of the filler metal is within a range of 50% to 90% of permeability of the first material.

5. The vacuum adiabatic body according to claim 1, wherein the filler metal comprises a second material, the second material comprises at least a portion of materials of the tube sealed to the first plate, the second material comprises a material different from that of the first plate, a mass of the second material is less than a mass of the first material, or a permeability of the second material is less than permeability of the first material.

6. The vacuum adiabatic body according to claim 5, wherein the second material comprises copper (Cu), or the filler metal contains 50% to 75% of the silver.

7. The vacuum adiabatic body according to claim 5, wherein the filler metal comprises a third material, and the third material comprises a material having a melting point lower than a melting point of each of the first material and the second material.

8. The vacuum adiabatic body according to claim 7, wherein the third material comprises zinc (Zn).

9. The vacuum adiabatic body according to claim 7, wherein a mass of the third material is less than a mass of the second material.

10. The vacuum adiabatic body according to claim 1, wherein a flange is disposed at a periphery of the through-hole, and is configured to guide the tube.

11. The vacuum adiabatic body according to claim 1, wherein the filler metal comprises copper, the filler metal comprises phosphorus (P) and copper (Cu), and the copper contains a largest amount of copper as a base material, the filler metal comprises phosphorus (P) and copper (Cu), and a content of the phosphorus is within a range of 5% to 15%, or the filler metal contains 15% or more of silver.

12. The vacuum adiabatic body according to claim 1, wherein the filler metal comprises copper and silver, and in a weight ratio of the filler metal, copper has a weight ratio greater than a weight ratio of silver, in a weight ratio of the filler metal, silver has a weight ratio greater than a weight ratio of phosphorus, or in a weight ratio of the filler metal, the silver has a weight ratio less than a weight ratio of copper and greater than a weight ratio of phosphorus.

13. The vacuum adiabatic body according to claim 1, wherein the filler metal has permeability within a range of 50% to 90% as compared to the permeability when only silver (Ag) is used.

14. A vacuum adiabatic body, comprising:
a first plate having a through-hole;
a second plate;
a seal configured to seal a space between the first plate and the second plate so as to provide an empty vacuum space between the first plate and the second plate;
a tube that extends into the through-hole of the first plate and partially into the vacuum space; and
a filler metal disposed at a bonding area of the seal, wherein the filler metal comprises at least a portion of materials contained in the seal, and wherein the filler metal comprises silver (Ag).

15. The vacuum adiabatic body according to claim 14, wherein the filler metal comprises a material having a melting point lower than a melting point of at least a portion of the materials contained in the seal.

16. The vacuum adiabatic body according to claim 15, wherein the filler metal comprises a material having a permeability higher than a permeability of at least a portion of the materials contained in the seal.

17. A vacuum adiabatic body, comprising:
a first plate having a through-hole;
a second plate; and
a seal configured to seal a space between the first plate and the second plate so as to provide a vacuum space between the first plate and the second plate; and
a filler metal disposed at a bonding area of the seal, wherein the filler metal comprises a material having a melting point lower than a melting point of at least a portion of materials contained in the seal, wherein the filler metal comprises silver (Ag), and wherein a mass of the silver is below 75% of a total mass of the filler metal.

18. The vacuum adiabatic body according to claim 17, wherein heat is applied to seal the filler metal.

19. The vacuum adiabatic body according to claim 18, wherein the filler metal comprise a material having a melting point lower than a melting point of silver.

20. An appliance, comprising the vacuum adiabatic body of claim 1.

* * * * *